US006525903B1

(12) United States Patent
Sasaki

(10) Patent No.: US 6,525,903 B1
(45) Date of Patent: Feb. 25, 2003

(54) THIN-FILM MAGNETIC HEAD AND METHOD OF MANUFACTURING SAME

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/453,694

(22) Filed: Dec. 3, 1999

(30) Foreign Application Priority Data

Dec. 11, 1998 (JP) ............................................. 10-353421

(51) Int. Cl.[7] ................................................ G11B 5/127
(52) U.S. Cl. ........................ 360/126; 360/360; 360/317
(58) Field of Search ................................ 360/317, 318, 360/119, 120, 126; 29/603.13, 603.14, 603.15

(56) References Cited

U.S. PATENT DOCUMENTS

| | | | | |
|---|---|---|---|---|
| 5,995,342 A | * | 11/1999 | Cohen | 360/126 |
| 6,043,959 A | * | 3/2000 | Crue et al. | 360/317 |
| 6,130,809 A | * | 10/2000 | Santini | 360/126 |
| 6,154,347 A | * | 11/2000 | Sasaki | 360/317 |
| 6,188,544 B1 | * | 2/2001 | Mino | 360/126 |
| 6,191,918 B1 | * | 2/2001 | Clarke et al. | 360/126 |
| 6,204,997 B1 | * | 3/2001 | Sasaki | 360/123 |
| 6,207,466 B1 | * | 3/2001 | Kamijima | 438/3 |

FOREIGN PATENT DOCUMENTS

| | | |
|---|---|---|
| JP | A-60-10409 | 1/1985 |
| JP | A-62-245509 | 10/1987 |

* cited by examiner

Primary Examiner—Brian E. Miller
Assistant Examiner—Chen Tianjie
(74) Attorney, Agent, or Firm—Oliff & Berridge, PLC

(57) ABSTRACT

A thin-film magnetic head and a method of manufacturing the same of the invention achieve reductions in a track width of a recording head and in a yoke length. In the thin-film magnetic head of the invention, a bottom pole layer and a top pole layer include: first portions located in a region including a region that faces a thin-film coil; second portions forming a pole portion and connected to the first portions; and third portions for connecting the first portions to each other. The thin-film coil is placed between the second portion and the third portion of each of the pole layers. Each of outermost and innermost ends of the coil is adjacent to each of a sidewall of the second portion and a sidewall of the third portion, respectively, while an insulating film formed on the sidewall of the second portion is placed between the outermost end of the coil and the sidewall of the second portion, and the insulating film formed on the sidewall of the third portion is placed between the innermost end of the coil and the sidewall of the third portion.

18 Claims, 12 Drawing Sheets

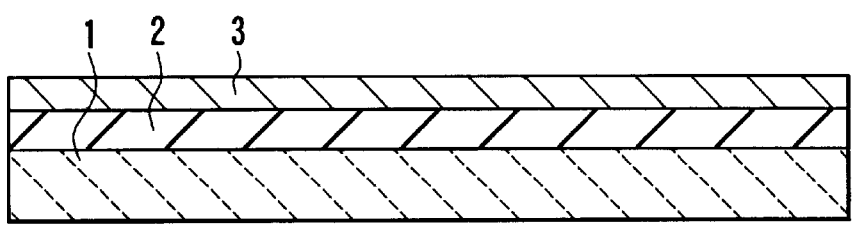 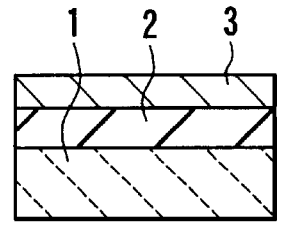
FIG. 1A        FIG. 1B
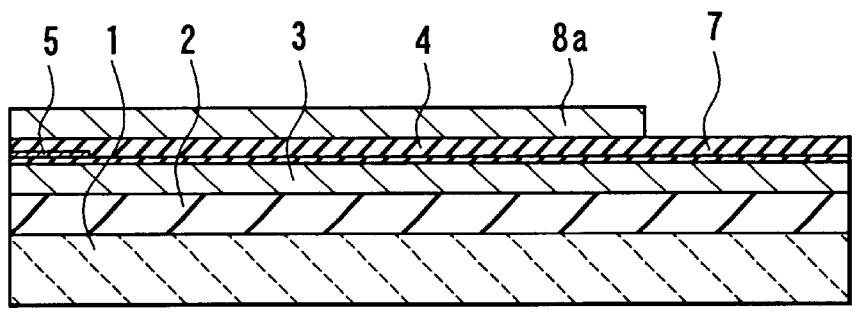 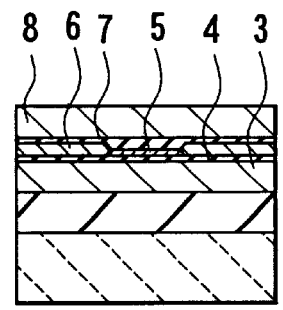
FIG. 2A        FIG. 2B
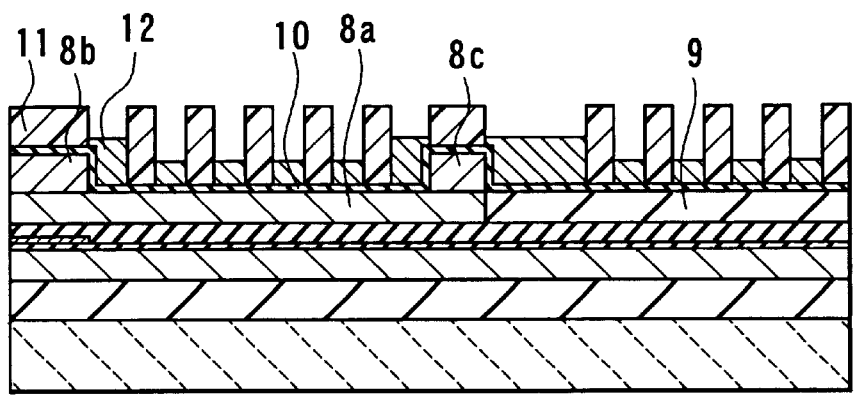 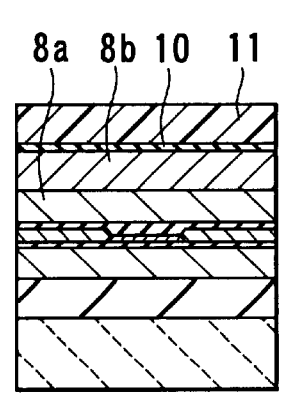
FIG. 3A        FIG. 3B

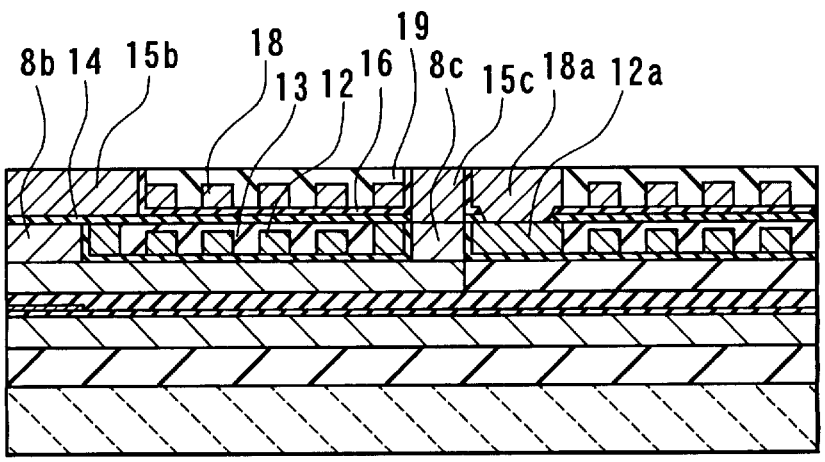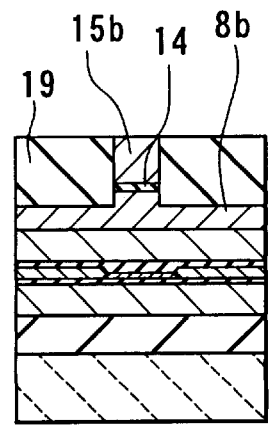
FIG. 6A   FIG. 6B
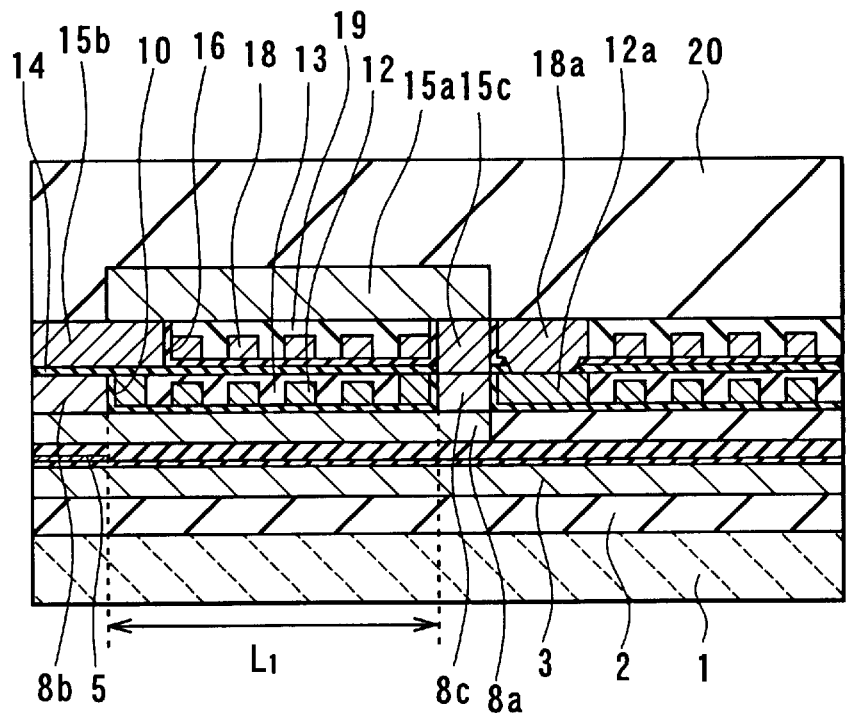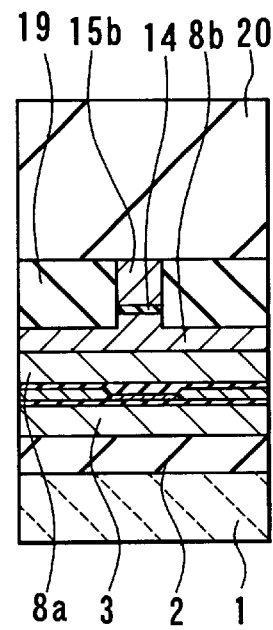
FIG. 7A   FIG. 7B

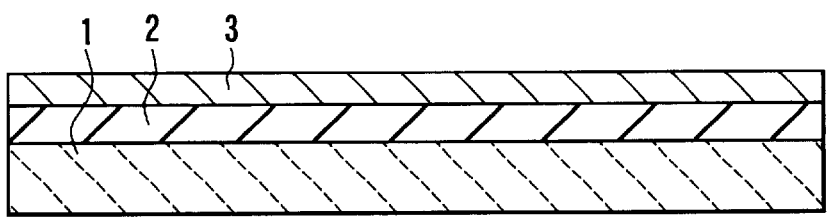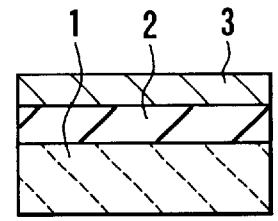
FIG. 10A    FIG. 10B
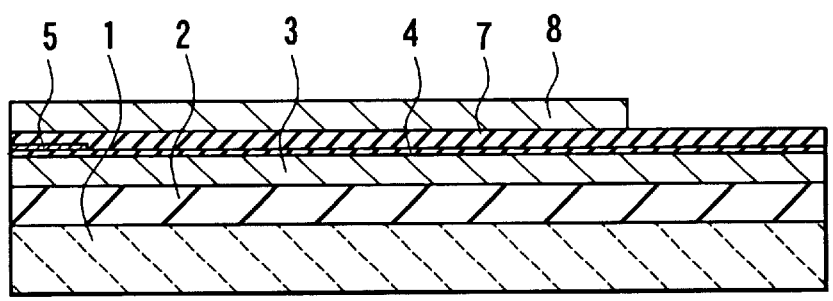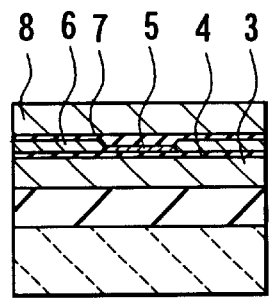
FIG. 11A    FIG. 11B
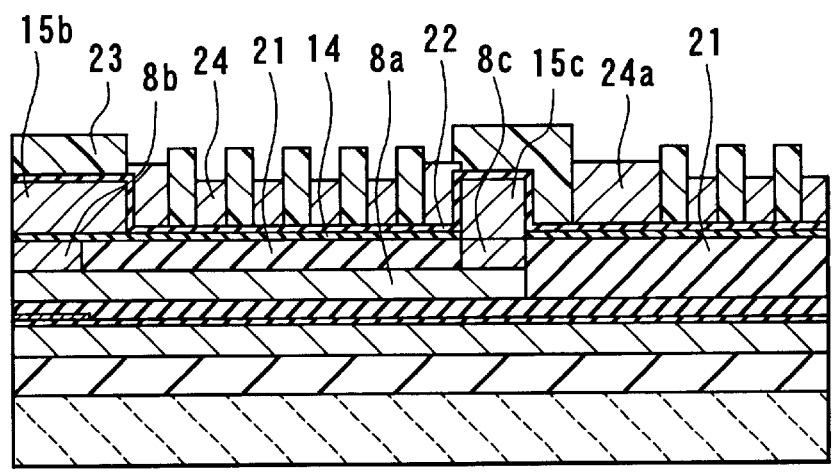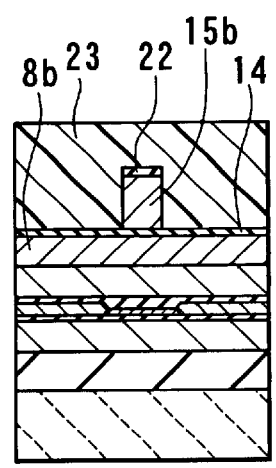
FIG. 12A    FIG. 12B

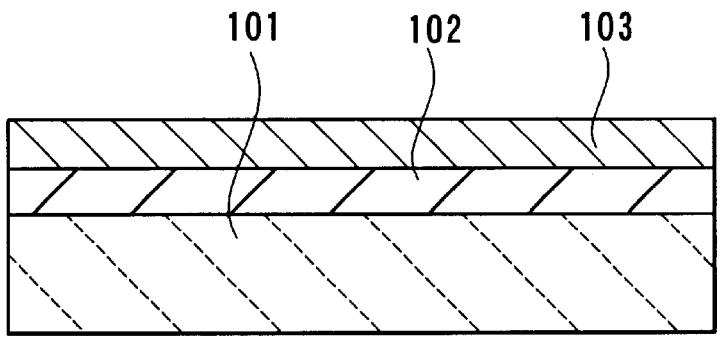
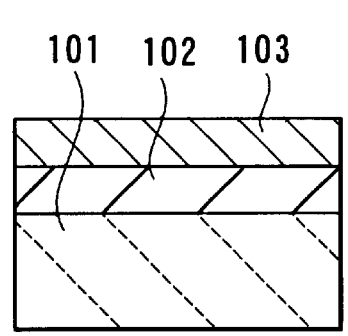
FIG. 17A
RELATED ART
FIG. 17B
RELATED ART
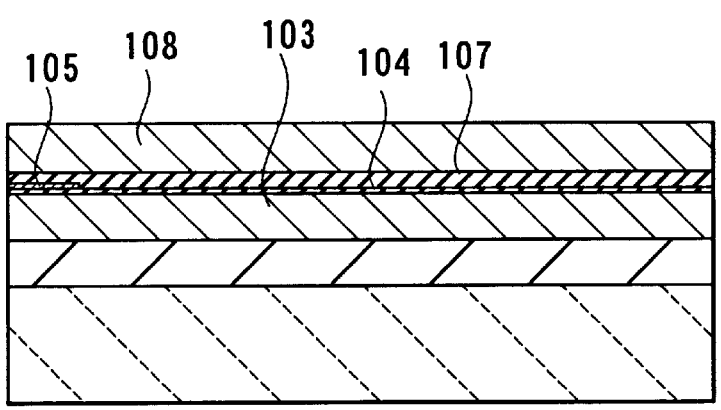
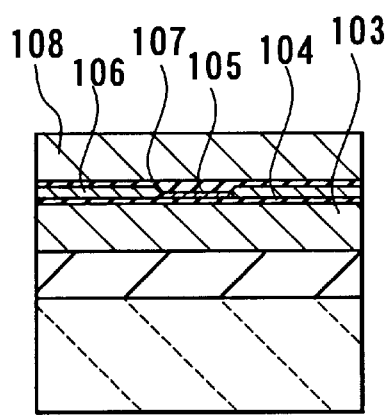
FIG. 18A
RELATED ART
FIG. 18B
RELATED ART
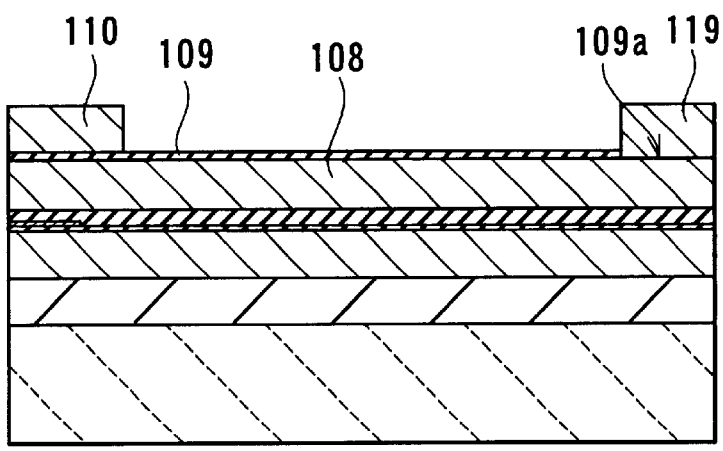
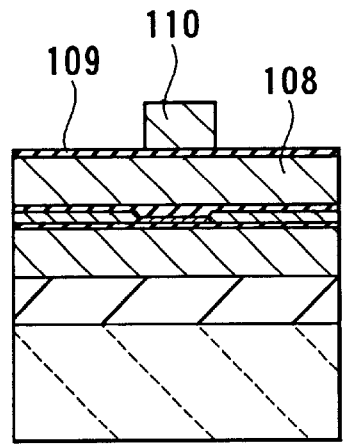
FIG. 19A
RELATED ART
FIG. 19B
RELATED ART

THIN-FILM MAGNETIC HEAD AND METHOD OF MANUFACTURING SAME

BACKGROUND OF THE INVENTION

1. Field of the Invention

The present invention relates to a thin-film magnetic head having at least an induction-type magnetic transducer and a method of manufacturing the thin-film magnetic head.

2. Description of the Related Art

Performance improvements in thin-film magnetic heads have been sought with an increase in surface recording density of a hard disk drive. A composite thin-film magnetic head has been widely used, which is made of a layered structure including a recording head having an induction-type magnetic transducer for writing and a reproducing head having a magnetoresistive (MR) element for reading. MR elements include an anisotropic magnetoresistive (AMR) element that utilizes the AMR effect and a giant magnetoresistive (GMR) element that utilizes the GMR effect. A reproducing head using an AMR element is called an AMR head or simply an MR head. A reproducing head using a GMR element is called a GMR head. An AMR head is used as a reproducing head whose surface recording density is more than 1 gigabit per square inch. A GMR head is used as a reproducing head whose surface recording density is more than 3 gigabits per square inch.

Methods for improving the performance of a reproducing head include replacing an AMR film with a GMR film and the like made of a material or a configuration having an excellent magnetoresistive sensitivity, or optimizing the MR height of the MR film. The MR height is the length (height) between the air-bearing-surface-side end of an MR element and the other end. The MR height is controlled by an amount of lapping when the air bearing surface is processed. The air bearing surface is the surface of a thin-film magnetic head that faces a magnetic recording medium and may be called a track surface as well.

Performance improvements in a recording head have been expected, too, with performance improvements in a reproducing head. One of the factors determining the recording head performance is the throat height (TH). The throat height is the length (height) of portions of the two pole layers facing each other with a recording gap layer in between, from the air-bearing-surface-side end to the other end. A reduction in throat height is desired in order to improve the recording head performance. The throat height is controlled as well by an amount of lapping when the air bearing surface is processed.

It is required to increase the track density on a magnetic recording medium in order to increase the recording density as one of the performance characteristics of a recording head. To achieve this, it is required to implement a recording head of a narrow track structure wherein the width on the air bearing surface of a bottom pole and a top pole sandwiching the recording gap layer is reduced to the micron or submicron order. Semiconductor process techniques are employed to achieve the narrow track structure.

Reference is now made to FIG. 17A to FIG. 22A and FIG. 17B to FIG. 22B to describe an example of a method of manufacturing a composite thin-film magnetic head as a related-art method of manufacturing a thin-film magnetic head. FIG. 17A to FIG. 22A are cross sections each orthogonal to the air bearing surface of the thin-film magnetic head. FIG. 17B to FIG. 22B are cross sections of a pole portion of the head each parallel to the air bearing surface.

In the manufacturing method, as shown in FIG. 17A and FIG. 17B, an insulating layer 102 made of alumina ($Al_2O_3$), for example, having a thickness of about 5 to 10 $\mu$m is deposited on a substrate 101 made of aluminum oxide and titanium carbide ($Al_2O_3$—TiC), for example. On the insulating layer 102 a bottom shield layer 103 made of a magnetic material is formed for making a reproducing head.

Next, as shown in FIG. 18A and FIG. 18B, on the bottom shield layer 103, alumina, for example, is deposited to a thickness of 100 to 200 nm through sputtering to form a bottom shield gap film 104 as an insulating layer. On the bottom shield gap film 104 an MR film having a thickness of tens of nanometers is formed for making an MR element 105 for reproduction. Next, on the MR film a photoresist pattern is selectively formed where the MR element 105 is to be formed. The photoresist pattern is formed into a shape that facilitates lift-off, such as a shape having a T-shaped cross section. Next, with the photoresist pattern as a mask, the MR film is etched through ion milling, for example, to form the MR element 105. The MR element 105 may be either a GMR element or an AMR element. Next, on the bottom shield gap film 104, a pair of electrode layers 106 are formed, using the photoresist pattern as a mask. The electrode layers 106 are electrically connected to the MR element 105.

Next, a top shield gap film 107 is formed as an insulating layer on the bottom shield gap film 104 and the MR element 105. The MR element 105 is embedded in the shield gap films 104 and 107.

Next, on the top shield gap film 107, a top shield layer-cum-bottom pole layer (called a bottom pole layer in the following description) 108 having a thickness of about 3 $\mu$m is formed. The bottom pole layer 108 is made of a magnetic material and used for both a reproducing head and a recording head. Next, on the bottom pole layer 108, a recording gap layer 109 made of an insulating film such as an alumina film whose thickness is 0.3 $\mu$m is formed.

Next, as shown in FIG. 19A and FIG. 19B, a portion of the recording gap layer 109 is etched to form a contact hole 119a to make a magnetic path. On the recording gap layer 109 in the pole portion, a top pole tip 110 made of a magnetic material such as Permalloy (NiFe) or FeN as a high saturation flux density material and having a thickness of 0.5 to 1.0 $\mu$m is formed for the recording head. The top pole tip 110 makes up part of the top pole. At the same time, a magnetic layer 119 made of a magnetic material is formed for making the magnetic path in the contact hole for making the magnetic path.

Next, as shown in FIG. 20A and FIG. 20B, the recording gap layer 109 and the bottom pole layer 108 are etched through ion-milling, using the top pole tip 110 as a mask. As shown in FIG. 20B, the structure is called a trim structure wherein the sidewalls of the top pole (the top pole tip 110), the recording gap layer 109, and part of the bottom pole layer 108 are formed vertically in a self-aligned manner. The trim structure suppresses an increase in the effective track width due to expansion of a magnetic flux generated during writing in a narrow track.

Next, an insulating layer 111 made of an alumina film, for example, and having a thickness of about 3 $\mu$m is formed on the entire surface. The insulating layer 111 is then polished to the surfaces of the top pole tip 110 and the magnetic layer 119 and flattened. The polishing method may be mechanical polishing or chemical mechanical polishing (CMP). Through this polishing, the surfaces of the top pole tip 110 and the magnetic layer 119 are exposed.

Next, as shown in FIG. 21A and FIG. 21B, on the flattened insulating layer 111, a thin-film coil 112 of a first layer is made of copper (Cu), for example, for the induction-type recording head. Next, a photoresist layer 113 is formed into a specific pattern on the insulating layer 111 and the coil 112. Heat treatment is then performed to flatten the surface of the photoresist layer 113. On the photoresist layer 113, a thin-film coil 114 of a second layer is then formed. Next, a photoresist layer 115 is formed into a specific pattern on the photoresist layer 113 and the coil 114. Heat treatment is then performed to flatten the surface of the photoresist layer 115.

Next, as shown in FIG. 22A and FIG. 22B, a top pole layer 116 is formed for the recording head on the top pole tip 110, the photoresist layers 113 and 115, and the magnetic layer 119. The top pole layer 116 is made of a magnetic material such as Permalloy. Next, an overcoat layer 117 of alumina, for example, is formed to cover the top pole layer 116. Finally, machine processing of the slider is performed to form the air bearing surface 118 of the recording head and the reproducing head. The thin-film magnetic head is thus completed. FIG. 23 is a top view of the thin-film magnetic head. The overcoat layer 117 is omitted in FIG. 23.

In FIG. 22A, 'TH' indicates the throat height and 'MR-H' indicates the MR height. In FIG. 22B, 'P2W' indicates the pole width, that is, the recording track width. In addition to the throat height, the MR height and so on, the apex angle as indicated with θ in FIG. 22A is one of the factors that determine the performance of a thin-film magnetic head. The apex is a hill-like raised portion of the coils covered with the photoresist layers 113 and 115. The apex angle is the angle formed between the top surface of the insulating layer 111 and the straight line drawn through the edges of the pole-side lateral walls of the apex.

In order to improve the performance of the thin-film magnetic head, it is important to precisely form throat height TH, MR height MR-H, apex angle θ, and track width P2W as shown in FIG. 22A or FIG. 22B.

To achieve high surface recording density, that is, to fabricate a recording head with a narrow track structure, it has been particularly required that track width P2W falls within the submicron order of 1.0 μm or less. It is therefore required to process the top pole into the submicron order through semiconductor process techniques. As the narrow track structure is obtained, it is also desired that the pole is made of a magnetic material having a high saturation flux density.

A problem is that it is difficult to form the top pole layer on the apex into small dimensions.

As disclosed in Japanese Patent Application Laid-open Hei 7-262519 (1995), for example, frame plating may be used as a method for fabricating the top pole layer. In this case, a thin electrode film made of Permalloy, for example, is formed by sputtering, for example, to fully cover the apex. Next, a photoresist is applied to the top of the electrode film and patterned through a photolithography process to form a frame to be used for plating. The top pole layer is then formed by plating through the use of the electrode film previously formed as a seed layer.

However, there is a difference in height between the apex and the other part, such as 7 to 10 μm or more. The photoresist whose thickness is 3 to 4 μm is applied to cover the apex. If the photoresist thickness is required to be at least 3 μm over the apex, a photoresist film having a thickness of 8 to 10 μm or more, for example, is formed below the apex since the fluid photoresist goes downward.

To implement a recording track width of the submicron order as described above, it is required to form a frame pattern of the submicron order through the use of a photoresist film. Therefore, it is required to form a fine pattern of the submicron order through the use of a photoresist film having a thickness of 8 to 10 μm or more. However, it is extremely difficult to form a photoresist pattern having such a thickness into a reduced pattern width, due to restrictions in a manufacturing process.

Furthermore, rays of light used for exposure of photolithography are reflected off the base electrode film as the seed layer. The photoresist is exposed to the reflected rays as well and the photoresist pattern may be out of shape. It is therefore impossible to obtain a sharp and precise photoresist pattern.

As thus described, it is difficult in related art to fabricate the top pole layer with accuracy if the pole width of the submicron order is required.

To overcome the problems thus described, a method has been taken, as shown in the foregoing related-art manufacturing steps illustrated in FIG. 19A to FIG. 22A and FIG. 19B to FIG. 22B. In this method, a track width of 1.0 μm or less is formed through the use of the top pole tip 110 effective for making a narrow track of the recording head. The top pole layer 116 to be a yoke portion connected to the top pole tip 110 is then fabricated (as disclosed in Japanese Patent Application Laid-open Sho 62-245509 [1987] and Japanese Patent Application Laid-open Sho 60-10409 [1985]). That is, the ordinary top pole layer is divided into the top pole tip 110 and the top pole layer 116 to be the yoke portion in this method. As a result, the top pole tip 110 that defines the track width is formed into a submicron width on the flat top surface of the recording gap layer 109.

However, problems described below are still found in such a thin-film magnetic head.

(1) In the related-art magnetic head, the throat height is defined by the end of the top pole tip 110 opposite to the air bearing surface 118. However, if the top pole tip 110 is reduced in width, edges of the pattern is rounded in a photolithography process. As a result, the throat height that is required to be precisely controlled is made uneven, and the balance between the throat height and the track width of the MR element is disturbed in the steps of lapping or polishing the air bearing surface 118. For example, if the track width of 0.5 to 0.6 μm is required, the end of the top pole tip 110 opposite to the air bearing surface 118 may be shifted from the zero throat height position (that is, the position of the air-bearing-surface-side end of the insulating layer that defines the throat height) toward the air bearing surface 118. The recording gap is thus made greater and writing of data is made impossible.

(2) In the related-art thin-film magnetic head shown in FIG. 22A and FIG. 22B, the track width of the recording head is defined by the top pole tip 110. Therefore, it is not necessary that the top pole layer 116 is processed into dimensions as small as those of the top pole tip 110. However, the top pole layer 116 is aligned on top of the top pole tip 110 through alignment of a photolithography process. Therefore, if both of the top pole layer 116 and the top pole tip 110 are greatly shifted to one side when seen from the air bearing surface 118, writing may be performed on a side of the top pole layer 116 and the effective track width may become greater. As a result, so-called 'side write' may results, that is, data is written in a region of a recording medium where data is not supposed to be written.

If the track width of the recording head is extremely reduced, that is, 0.5 μm or less, in particular, processing accuracy for achieving the submicron order width is required for the top pole layer 116, too. That is, if the difference in lateral dimensions between the top pole tip 110 and the top pole layer 116 is too great when seen from the air bearing surface 118, side write results as described above, and writing is performed in a region where data is not supposed to be written.

As thus described, not only the top pole tip 110 but also the top pole layer 116 is required to be processed to have a submicron width. However, since there is still a great difference in level in the apex below the top pole layer 116, it is difficult to process the top pole layer 116 into small dimensions.

(3) Furthermore, in the related-art magnetic head, it is difficult to reduce the magnetic path (yoke) length. That is, if the coil pitch is reduced, a head with a reduced yoke length is achieved and a recording head having an excellent high frequency characteristic is achieved, in particular. However, if the coil pitch is reduced to the limit, the distance between the zero throat height position and the outermost end of the coil is a major factor that prevents a reduction in yoke length. Since the yoke length of a two-layer coil can be shorter than that of a single-layer coil, a two-layer coil is adopted to many of recording heads for high frequency application. However, in the related-art magnetic head, a photoresist film having a thickness of about 2 $\mu$m is formed to provide an insulating film between coil layers after a first layer is formed. Consequently, a small and rounded apex is formed at the outermost end of the first layer of the coil. A second layer of the coil is then formed on the apex. The second layer is required to be formed on a flat portion since it is impossible to etch the seed layer of the coil in the sloped portion of the apex, and the coil is thereby shorted.

Therefore, if the total coil thickness is 2 to 3 $\mu$m, the thickness of the insulating film between the layers of the coil is 2 $\mu$m, and the apex angle is 45 to 55 degrees, for example, the yoke length is required to be 6 to 8 $\mu$m which is twice as long as the distance between the outermost end of the coil and the neighborhood of the zero throat height position, that is, 3 to 4 $\mu$m (the distance between the innermost end of the coil and the portion where the top and bottom pole layers are connected to each other is required to be 3 to 4 $\mu$m, too), in addition to the length of the portion corresponding to the coil. This length of the portion other than the portion corresponding to the coil is one of the factors that prevent a reduction in yoke length.

Assuming that a two-layered eleven-turn coil whose line width is 1.0 $\mu$m and the space is 0.5 $\mu$m is fabricated, for example, the portion of the yoke length corresponding to the coil 114 of the second layer is 7 $\mu$m, if the first layer is made up of six turns and the second layer is made up of 5 turns, as shown in FIG. 22A. In addition to this length, the total of 6 to 8 $\mu$m, that is, the distance between each of the outermost and innermost ends of the coil 114 of the second layer and each of ends of the photoresist layer 115 for insulating the coil 114, is required for the yoke length. Furthermore, the yoke length is required to include the total of 6 to 8 $\mu$m, that is, the distance between each end of the photoresist layer 115 and each end of the photoresist layer 113 for insulating the coil 112 of the first layer. In the present invention, the yoke length is the length of a portion of the pole layer except the pole portion and the contact portions. Yoke length $L_0$ is 19 $\mu$m in FIG. 22A. In the related art it is impossible to further reduce the yoke length, which prevents improvements in high frequency characteristic.

SUMMARY OF THE INVENTION

It is an object of the invention to provide a thin-film magnetic head and a method of manufacturing the same for reducing a track width of a recording head and reducing a yoke length.

A thin-film magnetic head of the invention comprises: a first magnetic layer and a second magnetic layer magnetically coupled to each other and including magnetic pole portions opposed to each other and placed in regions of the magnetic layers on a side of a medium facing surface of the head that faces toward a recording medium, each of the magnetic layers including at least one layer; a gap layer provided between the pole portions of the first and second magnetic layers; and a thin-film coil at least part of which is placed between the first and second magnetic layers, the at least part of the coil being insulated from the first and second magnetic layers. At least one of the first and second magnetic layers includes: a first portion located in a region including a region that faces the coil; a second portion including one of the pole portions and connected to the first portion; and a third portion for connecting the first portion to the other magnetic layer. The at least part of the coil is placed between the second portion and the third portion of the at least one of the magnetic layers. The head further comprises at least one of: an insulating film formed on a sidewall of the second portion and placed between an outermost end of the at least part of the coil and the sidewall of the second portion; and an insulating film formed on a sidewall of the third portion and placed between an innermost end of the at least part of the coil and the sidewall of the third portion. The outermost end of the at least part of the coil is adjacent to the sidewall of the second portion while the insulating film is placed between the outermost end and the sidewall of the second portion, or the innermost end of the at least part of the coil is adjacent to the sidewall of the third portion while the insulating film is placed between the innermost end and the sidewall of the third portion, or each of the outermost and innermost ends of the at least part of the coil is adjacent to each of the sidewall of the second portion and the sidewall of the third portion, respectively, while each of the insulating films is placed between the outermost end and the sidewall of the second portion and between the innermost end and the sidewall of the third portion, respectively.

A method of the invention is provided for manufacturing a thin-film magnetic head comprising: a first magnetic layer and a second magnetic layer magnetically coupled to each other and including magnetic pole portions opposed to each other and placed in regions of the magnetic layers on a side of a medium facing surface of the head that faces toward a recording medium, the magnetic layers each including at least one layer; a gap layer provided between the pole portions of the first and second magnetic layers; and a thin-film coil at least part of which is placed between the first and second magnetic layers, the at least part of the coil being insulated from the first and second magnetic layers. The method includes the steps of: forming the first magnetic layer; forming the gap layer on the first magnetic layer; forming the second magnetic layer on the gap layer; forming the coil such that the at least part of the coil is placed between the first and second magnetic layers, the at least part of the coil being insulated from the first and second magnetic layers. In at least one of the step of forming the first layer and the step of forming the second magnetic layer, at least one of the magnetic layers is formed to include: a first portion located in a region including a region that faces the coil; a second portion including one of the pole portions and connected to the first portion; and a third portion for connecting the first portion to the other magnetic layer. In the step of forming the coil, an insulating film is formed on at least one of a sidewall of the second portion and a sidewall of the third portion, and the coil is formed such that: the at least part of the coil is placed between the second portion and the third portion of the at least one of the magnetic layers; and an outermost end of the at least part of the coil is placed adjacent to the sidewall of the second portion while the insulating film is placed between the outermost end and the sidewall of the second portion, or the innermost end of the at least part of the coil is placed adjacent to the sidewall of the third portion while the insulating film is placed between the innermost end and the sidewall of the third portion, or each of the outermost and innermost ends of the at least part of the coil is placed adjacent to each of the sidewall of the second portion and the sidewall of the third portion, respectively, while the insulating film is placed between the outermost end and the sidewall of the second portion and between the innermost end and the sidewall of the third portion, respectively.

According to the thin-film magnetic head or the method of manufacturing the same of the invention, at least part of the coil is placed between the second portion and the third portion of at least one of the first and second magnetic layers. At least one of outermost and innermost ends of the at least part of the coil is placed adjacent to the sidewall of the second portion or the sidewall of the third portion while the insulating film is placed between the sidewall of the second portion or the sidewall of the third portion and the at least one of the outermost and innermost ends of the at least part of the coil. As a result, a reduction is yoke length is achieved.

According to the thin-film magnetic head or the method of manufacturing the same of the invention, the insulating film may be 1 μm or less in thickness.

According to the head or the method, the first magnetic layer may include the first, second and third portions, and the second portion of the first magnetic layer may define a throat height.

According to the head or the method, the second magnetic layer may include the first, second and third portions, and an end face of the first portion of the second magnetic layer that faces toward the recording medium may be located at a distance from the medium facing surface of the head.

According to the head or the method, each of the first and second magnetic layers may include the first, second and third portions. In this case, the second portion of the second magnetic layer may be equal to or greater than the second portion of the first magnetic layer in length. The thin-film coil may include: a first layer portion placed between the second portion and the third portion of the first magnetic layer; and a second layer portion placed between the second portion and the third portion of the second magnetic layer.

According to the head or the method, the second magnetic layer may include the first, second and third portions, and the thin-film coil may include: a first layer portion placed between the second portion and the third portion of the second magnetic layer; and a second layer portion placed on a side of the first layer portion opposite to the first magnetic layer.

According to the head or the method, the head may further comprise: a magnetoresistive element; and a first shield layer and a second shield layer for shielding the magnetoresistive element, portions of the shield layers that face toward the recording medium being opposed to each other with the magnetoresistive element in between. In this case, the second shield layer may be formed to function as the first magnetic layer as well.

According to the method, in the step of forming the first magnetic layer, the first magnetic layer may be formed to include the first, second and third portions, and in the step of forming the coil, an insulating film may be formed to cover entire top surfaces of the first, second and third portions of the first magnetic layer before the at least part of the coil is formed such that: the at least part of the coil is placed between the second portion and the third portion of the at least one of the magnetic layers; and an outermost end of the at least part of the coil is placed adjacent to the sidewall of the second portion while the insulating film is placed between the outermost end and the sidewall of the second portion, or an innermost end of the at least part of the coil is placed adjacent to the sidewall of the third portion while the insulating film is placed between the innermost end and the sidewall of the third portion, or each of the outermost and innermost ends of the at least part of the coil is placed adjacent to each of the sidewall of the second portion and the sidewall of the third portion, respectively, while the insulating film is placed between the outermost end and the sidewall of the second portion and between the innermost end and the sidewall of the third portion, respectively.

In the above case, the method may further include the step of forming an insulating layer for covering the at least part of the coil placed between the second and third portions of the first magnetic layer, and then flattening the tops of the second and third portions and the insulating layer, wherein, in the step of forming the gap layer, the gap layer is formed on the flattened second portion.

In the above case, in the step of forming the second magnetic layer, the second and third portions of the second magnetic layer may be formed on the gap layer, and in the step of forming the coil, an insulating film may be formed to cover entire top surfaces of the gap layer and the second and third portions of the second magnetic layer before a second layer portion of the coil is formed such that: the second layer portion is placed between the second portion and the third portion; and an outermost end of the second layer portion of the coil is placed adjacent to the sidewall of the second portion while the insulating film is placed between the outermost end and the sidewall of the second portion, or an innermost end of the second layer portion of the coil is placed adjacent to the sidewall of the third portion while the insulating film is placed between the innermost end and the sidewall of the third portion, or each of the outermost and innermost ends of the second layer portion of the coil is placed adjacent to each of the sidewall of the second portion and the sidewall of the third portion, respectively, while the insulating film is placed between the outermost end and the sidewall of the second portion and between the innermost end and the sidewall of the third portion, respectively.

In the above case, the method may further include the step of forming a second insulating layer for covering the second layer portion of the coil placed between the second and third portions of the second magnetic layer, and then flattening the tops of the second and third portions and the second insulating layer, wherein, in the step of forming the second magnetic layer, the first portion of the second magnetic layer is formed on the flattened second and third portions and the second insulating layer.

According to the method, it is possible that: in the step of forming the second magnetic layer, the second and third portions of the second magnetic layer may be formed on the gap layer; in the step of forming the coil, an insulating film may be formed to cover entire top surfaces of the gap layer and the second and third portions of the second magnetic layer before a first layer portion of the coil is formed such that: the first layer portion is placed between the second portion and the third portion; and an outermost end of the first layer portion of the coil is placed adjacent to the sidewall of the second portion while the insulating film is placed between the outermost end and the sidewall of the second portion, or an innermost end of the first layer portion of the coil is placed adjacent to the sidewall of the third portion while the insulating film is placed between the innermost end and the sidewall of the third portion, or each of the outermost and innermost ends of the first layer portion of the coil is placed adjacent to each of the sidewall of the second portion and the sidewall of the third portion, respectively, while the insulating film is placed between the outermost end and the sidewall of the second portion and between the innermost end and the sidewall of the third portion, respectively. After the first layer portion is thus formed, an insulating layer may be formed to cover the first layer portion placed between the second portion and the third portion, and then a second layer portion of the coil may be formed on the insulating layer, and in the step of forming the second magnetic layer, the first portion of the second magnetic layer may be formed on the second and third portions of the second magnetic layer and the second layer portion of the coil, the first portion being insulated from the second layer portion of the coil.

Other and further objects, features and advantages of the invention will appear more fully from the following description.

BRIEF DESCRIPTION OF THE DRAWINGS

FIG. 1A and FIG. 1B are cross sections for illustrating a step in a method of manufacturing a thin-film magnetic head of a first embodiment of the invention.

FIG. 2A and FIG. 2B are cross sections for illustrating a step that follows FIG. 1A and FIG. 1B.

FIG. 3A and FIG. 3B are cross sections for illustrating a step that follows FIG. 2A and FIG. 2B.

FIG. 6A and FIG. 6B are cross sections for illustrating a step that follows FIG. 5A and FIG. 5B.

FIG. 7A and FIG. 7B are cross sections for illustrating a step that follows FIG. 6A and FIG. 6B.

FIG. 10A and FIG. 10B are cross sections for illustrating a step in a method of manufacturing a thin-film magnetic head of a second embodiment of the invention.

FIG. 11A and FIG. 11B are cross sections for illustrating a step that follows FIG. 10A and FIG. 10B.

FIG. 12A and FIG. 12B are cross sections for illustrating a step that follows FIG. 11A and FIG. 11B.

FIG. 17A and FIG. 17B are cross sections for illustrating a step in a method of manufacturing a thin-film magnetic head of related art.

FIG. 18A and FIG. 18B are cross sections for illustrating a step that follows FIG. 17A and FIG. 17B.

FIG. 19A and FIG. 19B are cross sections for illustrating a step that follows FIG. 18A and FIG. 18B.

DETAILED DESCRIPTION OF THE PREFERRED EMBODIMENTS

Figures 4A, 4B:
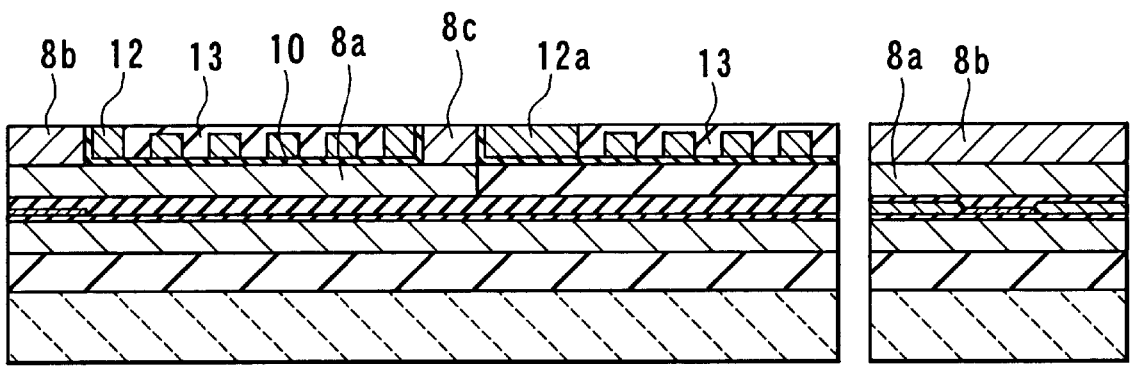
FIG. 4A and FIG. 4B are cross sections for illustrating a step that follows FIG. 3A and FIG. 3B.

Preferred embodiments of the invention will now be described in detail with reference to the accompanying drawings.

[First Embodiment]

Reference is now made to FIG. 1A to FIG. 7A, FIG. 1B to FIG. 7B, FIG. 8 and FIG. 9 to describe a method of manufacturing a composite thin-film magnetic head as a method of manufacturing a composite thin-film magnetic head of a first embodiment of the invention. FIG. 1A to FIG. 7A are cross sections each orthogonal to the air bearing surface of the magnetic head. FIG. 1B to FIG. 7B are cross sections each parallel to the air bearing surface of the pole portion of the magnetic head.

In the manufacturing method, as shown in FIG. 1A and FIG. 1B, an insulating layer 2 made of alumina ($Al_2O_3$), for example, whose thickness is about 5 $\mu$m, is deposited on a substrate 1 made of aluminum oxide and titanium carbide ($Al_2O_3$—TiC), for example. On the insulating layer 2 a bottom shield layer 3 made of a magnetic material such as Permalloy and having a thickness of about 3 $\mu$m is formed for making a reproducing head. The bottom shield layer 3 is formed through plating selectively on the insulating layer 2 with a photoresist film as a mask, for example. Next, although not shown, an insulating layer of alumina, for example, having a thickness of 4 to 5 $\mu$m, for example, is formed over the entire surface. This insulating layer is polished through CMP, for example, so that the bottom shield layer 3 is exposed and the surface is flattened.

Next, as shown in FIG. 2A and FIG. 2B, on the bottom shield layer 3, alumina or aluminum nitride, for example, is deposited through sputtering to form a bottom shield gap film 4 as an insulating layer. On the bottom shield gap film 4, an MR film having a thickness of tens of nanometers is formed for making an MR element 5 for reproduction. Next, on the MR film a photoresist pattern is selectively formed where the MR element 5 is to be formed. Next, with the photoresist pattern as a mask, the MR film is etched through ion milling, for example, to form the MR element 5. The MR element 5 may be either a GMR element or an AMR element. Next, on the bottom shield gap film 4, a pair of electrode layers 6 having a thickness of tens of nanometers are formed, using the photoresist pattern as a mask. The electrode layers 6 are electrically connected to the MR element 5. Next, a top shield gap film 7 is formed as an insulating layer on the bottom shield gap film 4 and the MR element 5. The MR element 5 is embedded in the shield gap films 4 and 7. Next, on the top shield gap film 7, a first portion 8a of a top shield layer-cum-bottom pole layer (called a bottom pole layer in the following description) having a thickness of about 1.0 to 2.0 $\mu$m is selectively formed. The bottom pole layer is made of a magnetic material and used for both a reproducing head and a recording head. The first portion 8a of the bottom pole layer is placed in a region including a region facing a thin-film coil described later.

Next, as shown in FIGS. 3A and 3B, an insulating layer 9 made of alumina, for example, is formed over the entire surface. The insulating layer 9 is greater than the first portion 8a in thickness. The insulating layer 9 is polished through CMP, for example, until the first portion 8a is exposed, and the surface is thereby flattened.

Next, a second portion 8b and a third portion 8c of the bottom pole layer, each having a thickness of 1.5 to 2.5 μm, are formed on the first portion 8a.

The second portion 8b makes up a pole portion of the bottom pole layer and is connected to the first portion 8a. The third portion 8c is provided for connecting the first portion 8a to a top pole layer. In this embodiment the throat height is defined by the position of the end of the second potion 8b opposite to the air bearing surface (the right side of FIG. 3A). That is, this position is the zero throat height position.

The second portion 8b and the third portion 8c of the bottom pole layer may be made of NiFe (80 weight % Ni and 20 weight % Fe), or NiFe (45 weight % Ni and 55 weight % Fe) as a high saturation flux density material through plating or may be made of a material such as FeN or FeZrN as a high saturation flux density material through sputtering. Alternatively, a material such as CoFe or a Co-base amorphous material as a high saturation flux density material may be used.

Next, an insulating film 10 of alumina, for example, is formed over the entire surface. The thickness of the insulating film 10 is preferably 1 μm or less. The reason is that the yoke length is made too long if the thickness of the insulating film 10 is more than 1 μm. In this embodiment the thickness of the insulating layer 10 is about 0.3 to 0.6 μm.

Next, although not shown, a seed layer is formed through sputtering, for example, for making a first layer portion of a thin-film coil. A photoresist is then applied to the top of the seed layer and patterned through a photolithography process. A frame 11 to be used for plating is thus formed.

In the embodiment, the frame 11 is formed such that: the first layer of the thin-film coils is placed between the second portion 8b and the third portion 8c of the bottom pole layer; and the outermost and innermost ends of the first layer of the coil are placed adjacent to the sidewall of the second portion 8b or the sidewall of the third portion 8c while the insulating film 10 formed on the sidewall of the second portion 8b is placed between the outermost end of the first layer of the coil and the sidewall of the second portion 8b, and the insulating film 10 formed on the sidewall of the third portion 8c is placed between the innermost end of the first layer of the coil and the sidewall of the third portion 8c.

Next, the first layer 12 of the coil made of copper (Cu), for example, is formed by frame plating through the use of the frame 11. The thickness of the first layer 12 is about 1.0 to 2.0 μm, for example. The pitch thereof is about 1.2 to 2.0 μm, for example.

In the embodiment as thus described, the first layer 12 of the thin-film coil is placed between the second portion 8b and the third portion 8c of the bottom pole layer. In addition, the outermost and innermost ends of the first layer 12 are placed adjacent to the sidewall of the second portion 8b or the sidewall of the third portion 8c while the insulating film 10 formed on the sidewall of the second portion 8b is placed between the outermost end of the first layer 12 and the sidewall of the second portion 8b, and the insulating film 10 formed on the sidewall of the third portion 8c is placed between the innermost end of the first layer 12 and the sidewall of the third portion 8c.

In FIG. 3A, the portion of the first layer 12 of the coil that is adjacent to the sidewall of the second portion 8b or the sidewall of the third portion 8c with the insulating film 10 in between is greater than other portions in thickness. The reason is that the area of the portion of the seed layer that is adjacent to the sidewall of the second portion 8b or the third portion 8c is greater than the area of the other portion of the seed layer. However, it is possible to make all the portions of the first layer 12 equal in thickness, depending on conditions, such as electric current, for forming the first layer 12 by plating.

Next, as shown in FIG. 4A and FIG. 4B, the frame 11 and the seed layer beneath it are removed. An insulating layer 13 made of alumina, for example, and having a thickness of about 3 to 4 μm is then formed over the entire surface. Next, the insulating layer 13 is polished through CMP, for example, until the second portion 8b and the third portion 8c are exposed, and the surface is flattened. In FIG. 4A, the portion of the first layer 12 of the coil that is adjacent to the sidewall of the second portion 8b or the third portion 8c through the insulating film 10 is exposed while the other portions are not exposed. Alternatively, the other portions of the first layer 12 may be exposed, too. If all the portions of the first layer 12 are made equal in thickness, all the portions of the first layer 12 may be exposed or may not be exposed through the flattening process. However, if a portion 12a of the first layer 12 that is to be connected to a second layer of the coil described later is not exposed through the flattening process, the portion 12a is exposed through a photolithography technique.

Figures 5A, 5B:
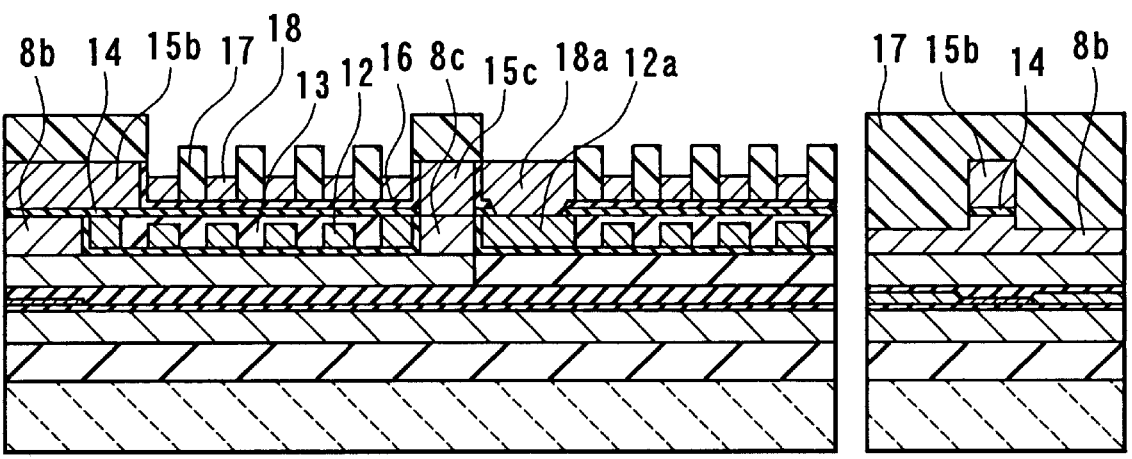
FIG. 5A and FIG. 5B are cross sections for illustrating a step that follows FIG. 4A and FIG. 4B.

Next, as shown in FIG. 5A and FIG. 5B, a recording gap layer 14 made of an insulating material whose thickness is about 0.2 to 0.3 μm is formed on the second portion 8b and the third portion 8c of the bottom pole layer, and the insulating layer 13. In general, the insulating material used for the recording gap layer 14 may be alumina, aluminum nitride, a silicon-dioxide-base material, or a silicon-nitride-base material.

Next, a portion of the recording gap layer 14 on the third portion 8c is etched to form a contact hole for making a magnetic path. In addition, a portion of the recording gap layer 14 on the portion 12a is etched to form a contact hole for connecting the portion 12a of the first layer to the second layer of the coil.

Next, on the recording gap layer 14, a second portion 15b of a top pole layer having a thickness of 2.0 to 3.0 μm is formed. On the third portion 8c of the bottom pole layer, a third portion 15c of the top pole layer having a thickness of 2.0 to 3.0 μm is formed. The second portion 15b makes up a pole portion of the top pole layer and is connected to a first portion of the top pole layer described later. The third portion 15c is provided for connecting the first portion of the top pole layer to the bottom pole layer. In this embodiment the second potion 15b of the top pole layer is greater in length than the second portion 8b of the bottom pole layer. The second portion 15b and the third portion 15c of the top pole layer may be made of NiFe (80 weight % Ni and 20 weight % Fe), or NiFe (45 weight % Ni and 55 weight % Fe) as a high saturation flux density material through plating or may be made of a material such as FeN or FeZrN as a high saturation flux density material through sputtering. Alternatively, a material such as CoFe or a Co-base amorphous material as a high saturation flux density material may be used.

Next, the recording gap layer 14 is selectively etched through dry etching, using the second portion 15b of the top pole layer as a mask. The dry etching may be reactive ion etching (RIE) using a chlorine-base gas such as $BCl_2$ or $Cl_2$, or a fluorine-base gas such as $CF_4$ or $SF_6$, for example. Next, the second portion 8b of the bottom pole layer is selectively etched by about 0.3 to 0.6 μm through argon ion milling, for example. A trim structure as shown in FIG. 5B is thus formed. The trim structure suppresses an increase in the effective track width due to expansion of a magnetic flux generated during writing in a narrow track.

Next, an insulating film 16 of alumina, for example, is formed over the entire surface. The thickness of the insulating film 16 is preferably 1 μm or less. The reason is that the yoke length is made too long if the thickness of the insulating film 16 is more than 1 μm. In this embodiment the thickness of the insulating film 16 is about 0.3 to 0.6 μm.

Next, although not shown, a seed layer is formed through sputtering, for example, for making the second layer of the thin-film coil. A photoresist is then applied to the top of the seed layer and patterned through a photolithography process. A frame 17 to be used for plating is thus formed.

In the embodiment, the frame 17 is formed such that: the second layer of the thin-film coil is placed between the second portion 15b and the third portion 15c of the top pole layer; and the outermost and innermost ends of the second layer of the coil are adjacent to the sidewall of the second portion 15b or the sidewall of the third portion 15c while the insulating film 16 formed on the sidewall of the second portion 15b is placed between the outermost end of the second layer 18 of the coil and the sidewall of the second portion 15b, and the insulating film 16 formed on the sidewall of the third portion 15c is placed between the innermost end of the second layer 18 of the coil and the sidewall of the third portion 15c.

Next, the second layer 18 of the coil made of copper (Cu), for example, is formed by frame plating through the use of the frame 17. The thickness of the second layer 18 is about 2.0 to 3.0 μm, for example. The pitch thereof is about 1.2 to 2.0 μm, for example. A portion 18a of the second layer 18 placed on the portion 12a of the first layer 12 is connected to the portion 12a through the contact hole.

In the embodiment as thus described, the second layer 18 of the thin-film coil is placed between the second portion 15b and the third portion 15c of the top pole layer. In addition, the outermost and innermost ends of the second layer 18 are adjacent to the sidewall of the second portion 15b or the sidewall of the third portion 15c while the insulating film 16 formed on the sidewall of the second portion 15b is placed between the outermost end of the second layer 18 of the coil and the sidewall of the second portion 15b, and the insulating film 16 formed on the sidewall of the third portion 15c is placed between the innermost end of the second layer 18 of the coil and the sidewall of the third portion 15c.

Next, as shown in FIG. 6A and FIG. 6B, the frame 17 and the seed layer beneath it are removed. An insulating layer 19 made of alumina, for example, and having a thickness of about 3 to 4 μm is then formed over the entire surface. Next, the insulating layer 19 is polished through CMP, for example, until the second portion 15b and the third portion 15c are exposed, and the surface is flattened.

Next, as shown in FIG. 7A and FIG. 7B, the first portion 15a of the top pole layer made of a magnetic material and having a thickness of about 2 to 3 μm, for example, is formed for the recording head on the flattened second portion 15b and the third portion 15c of the top pole layer and the insulating layer 19. The first portion 15a is placed in a region including a region facing the thin-film coils 12 and 18. The first portion 15a is in contact with the third portion 8c of the bottom pole layer and magnetically coupled to the third portion 8c through the third portion 15c. The first portion 15a may be made of NiFe (80 weight % Ni and 20 weight % Fe), or NiFe (45 weight % Ni and 55 weight % Fe) as a high saturation flux density material through plating or may be made of a material such as FeN or FeZrN as a high saturation flux density material through sputtering. Alternatively, a material such as CoFe or a Co-base amorphous material as a high saturation flux density material may be used. To improve the high frequency characteristic, the first portion 15a may be made of a plurality of layers of inorganic insulating films and magnetic layers such as those of Permalloy.

In the embodiment, the end face of the first portion 15a of the top pole layer that faces toward a recording medium (the air bearing surface) is placed at a distance (the right side of each of the drawings) from the surface of the thin-film magnetic head that faces toward the recording medium.

Next, an overcoat layer 20 of alumina, for example, having a thickness of 20 to 40 μm is formed to cover the first portion 15a. The surface of the overcoat layer 20 is then flattened and pads (not shown) for electrodes are formed on the overcoat layer 20. Finally, lapping of the slider is performed to form the air bearing surfaces of the recording head and the reproducing head. The thin-film magnetic head of the embodiment is thus completed.

In this embodiment the bottom pole layer made up of the first portion 8a, the second portion 8b and the third portion 8c corresponds to a first magnetic layer of the invention. The top pole layer made up of the first portion 15a, the second portion 15b and the third portion 15c corresponds to a second magnetic layer of the invention.

Figure 8:
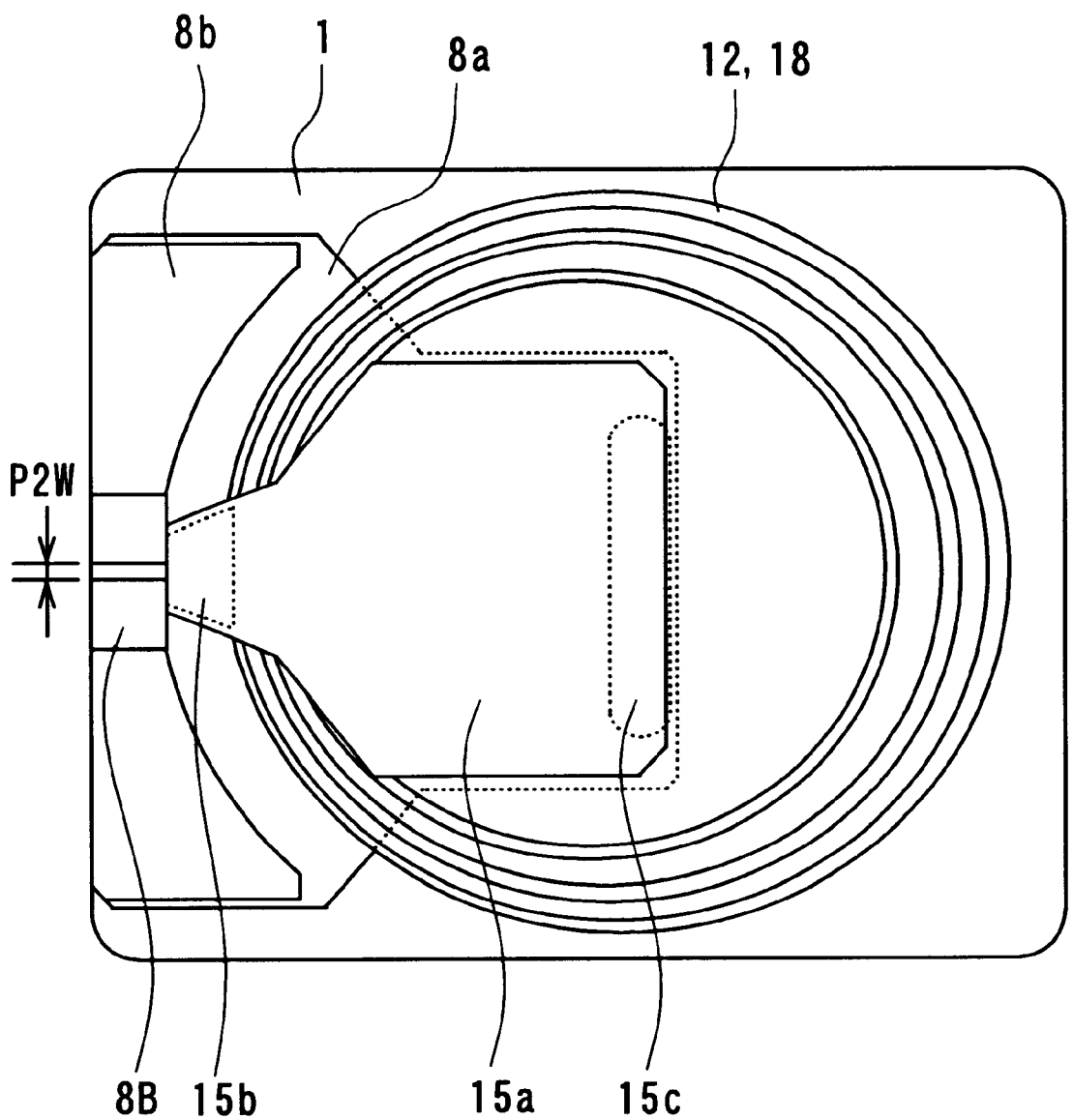
FIG. 8 is a top view of the thin-film magnetic head of the first embodiment.
Figure 9:
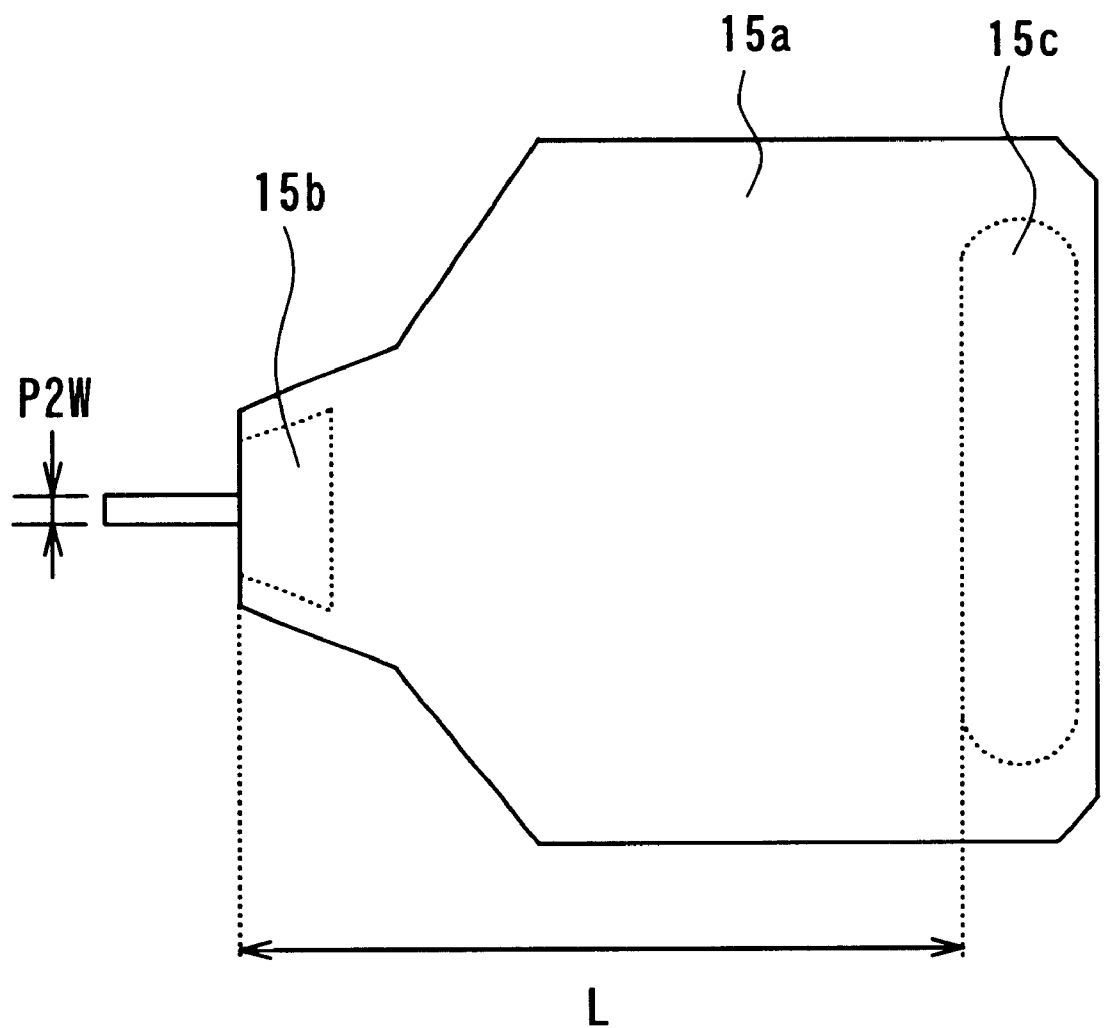
FIG. 9 is a top view of a top pole layer of the thin-film magnetic head shown in FIG. 8.

FIG. 8 is a top view of the thin-film magnetic head of the embodiment manufactured as described above. The overcoat layer 20 is omitted in FIG. 8. In FIG. 8 numeral 8B indicates the portion of the second portion 8b of the bottom pole layer etched to form the trim structure. FIG. 9 only illustrates the top pole layer of the thin-film magnetic head shown in FIG. 8.

As shown in FIG. 8 and FIG. 9, the top pole layer has: the first portion 15a located in a region including the region that faces the thin-film coils 12 and 18; the second portion 15b forming the pole portion; and the third portion 15c for connecting the first portion 15a to the bottom pole layer. Width P2W of the air bearing surface of the second portion 15b defines the recording track width.

In this embodiment as thus described, both of the top and bottom pole layers are made up of: the first portions 8a and 15a located in a region including the region that faces the thin-film coils 12 and 18; the second portions 8b and 15b forming the pole portions and each connected to the first portions 8a and 15a, respectively; and the third portions 8c and 15c for connecting each of the first portions 8a and 15a to the other magnetic layer. The first layer 12 of the thin-film coil is placed between the second portion 8b and the third portion 8c of the bottom pole layer. In addition, each of the outermost and innermost ends of the first layer 12 is placed adjacent to each of the sidewall of the second portion 8b and the sidewall of the third portion 8c, respectively, while the insulating film 10 formed on the sidewall of the second portion 8b is placed between the outermost end of the first layer 12 of the coil and the sidewall of the second portion 8b, and the insulating film 10 formed on the sidewall of the third portion 8c is placed between the innermost end of the first layer 12 of the coil and the sidewall of the third portion 8c. Similarly, the second layer 18 of the thin-film coil is placed between the second portion 15b and the third portion 15c of the top pole layer. In addition, each of the outermost and innermost ends of the second layer 18 is placed adjacent to each of the sidewall of the second portion 15b and the sidewall of the third portion 15c, respectively, while the insulating film 16 formed on the sidewall of the second portion 15b is placed between the outermost end of the second layer 18 of the coil and the sidewall of the second portion 15b, and the insulating film 16 formed on the sidewall of the third portion 15c is placed between the innermost end of the second layer 18 of the coil and the sidewall of the third portion 15c.

Therefore, according to the embodiment, both of the second portion 8b of the bottom pole layer and the second portion 15b of the top pole layer for making up the pole portions of the recording head are formed on the flat surface. As a result, it is possible to reduce the second portions 8b and 15b in size. It is thus possible to obtain the half-micron-order or quarter-micron-order second portion 15b of the top pole layer that defines the track width of the recording head and to reduce the track width of the recording head. It is thereby possible to achieve a thin-film magnetic head having surface recording density of 20 to 30 gigabits per square inch that will be desired in the near future.

In the embodiment, the pitch of the thin-film coils 12 and 18 is reduced since the coils 12 and 18 are formed on the flat surface. Furthermore, each of the outermost and innermost ends of the coils 12 and 18 is placed adjacent to the sidewalls of the second portions 8b and 15b and the sidewalls of the third portions 8c and 15c while each of the insulating films 10 and 16 is placed between each of the sidewalls of the second portions 8b and 15b and the sidewalls of the third portions 8c and 15c and the outermost and innermost ends of the coils 12 and 18. Consequently, the portions made up of the coils 12 and 18 and the insulating films surrounding the coils are reduced in size. As a result, according to the embodiment, the yoke length of the recording head is reduced by about 30 to 50 percent of that of a prior-art head, for example. The embodiment of the invention thus provides a thin-film magnetic head having an excellent high frequency characteristic.

Figures 22A, 22B:
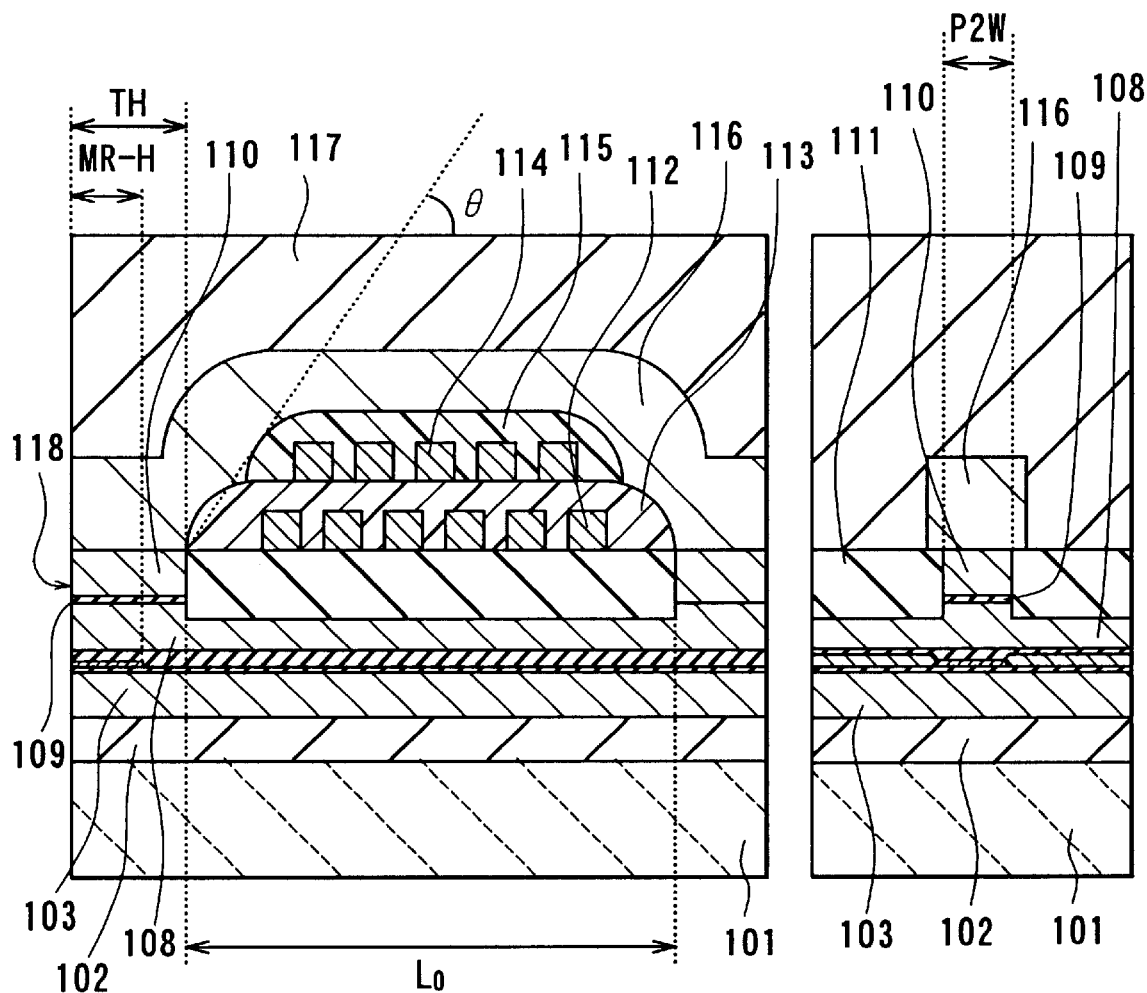
FIG. 22A and FIG. 22B are cross sections for illustrating a step that follows FIG. 21A and FIG. 21B.
Figure 23:
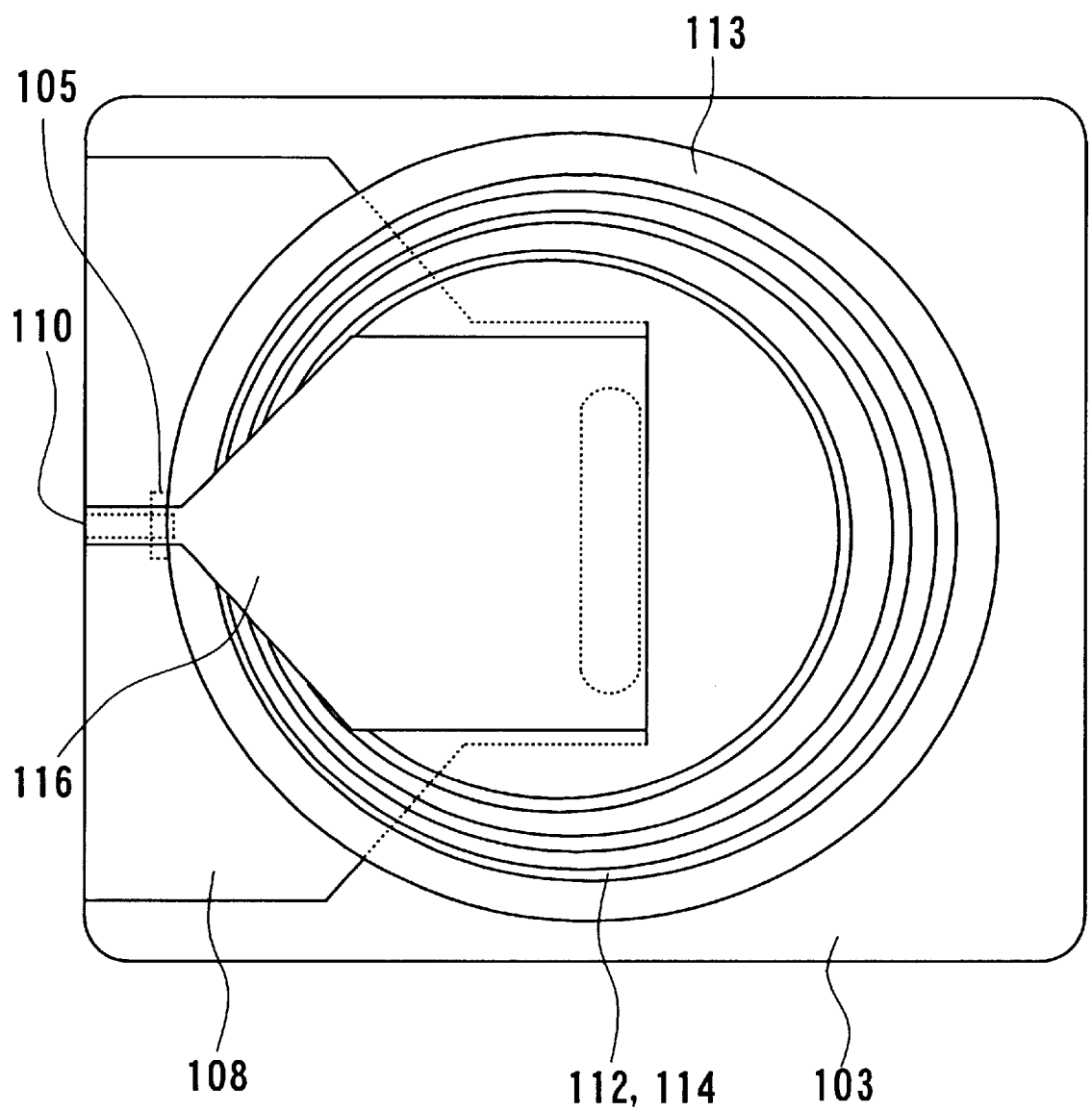
FIG. 23 is a top view of the related-art thin-film magnetic head.

It is assumed that yoke length is $L_1$, as shown in FIG. 7A, if the coils 12 and 18 of the embodiment are fabricated, according to the design rule the same as that of the related-art magnetic head shown in FIG. 22A. A specific example of the value of yoke length $L_1$ may be 9.1 $\mu$m, which is less than 50 percent of 19.0 $\mu$m, yoke length $L_0$ of the related-art head.

According to the embodiment, the outermost ends of the coils 12 and 18 are placed near the zero throat height position. It is thereby possible to prevent magnetomotive force generated by the coils 12 and 18 from saturating halfway, so that the magnetomotive force is efficiently used for recording. As a result, it is possible to provide a thin-film magnetic head having an excellent nonlinear transition shift (NLTS) characteristic and an excellent overwrite characteristic.

According to the embodiment, the throat height is defined by the second portion 8b of the bottom pole layer. As shown in FIG. 8, the second portion 8b is formed as a large pattern through photolithography. As a result, the position of the end of the pattern is more precisely controlled, compared to a case in which the throat height is defined by the pole portion of the top pole layer that is required to be formed into small dimensions. The embodiment therefore allows the throat height to be defined with precision.

According to the embodiment, the air-bearing-surface-side end of the first portion 15a of the top pole layer is located at a distance from the air bearing surface of the thin-film magnetic head. Consequently, even if the throat height is low, the first portion 15a is not exposed from the air bearing surface. As a result, the side write is avoided and an increase in the effective track width is prevented.

According to the embodiment, the inorganic insulating film 10 that is thin and achieves sufficient insulation strength is provided between the bottom pole layer (8a, 8b and 8c) and the first layer 12 of the coil. High insulation strength is thereby obtained between the bottom pole layer and the first layer 12. The inorganic insulating layer 13 and the inorganic insulating film 16 are provided, in addition to the recording gap layer 14, between the first layer 12 and the second layer 18 of the coils. As a result, high insulation strength is obtained between the first layer 12 and the second layer 18, and leakage flux from the coils 12 and 18 is reduced.

According to the embodiment, as shown in FIG. 8, the second portion 8b of the bottom pole layer is placed in a wide area near the periphery of the coils 12 and 18. It is therefore easy to perform a flattening process after the formation of the first layer 12.

[Second Embodiment]

Reference is now made to FIG. 10A to FIG. 16A and FIG. 10B to FIG. 16B to describe a method of manufacturing a composite thin-film magnetic head as a method of manufacturing a thin-film magnetic head of a second embodiment of the invention. FIG. 10A to FIG. 16A are cross sections each orthogonal to the air bearing surface of the magnetic head. FIG. 10B to FIG. 16B are cross sections each parallel to the air bearing surface of the pole portion of the magnetic head.

In the manufacturing method, as shown in FIG. 10A and FIG. 10B, the insulating layer 2 made of alumina ($Al_2O_3$), for example, whose thickness is about 5 $\mu$m, is deposited on the substrate 1 made of aluminum oxide and titanium carbide ($Al_2O_3$—TiC), for example. On the insulating layer 2 the bottom shield layer 3 made of a magnetic material such as Permalloy and having a thickness of about 3 $\mu$m is formed for making a reproducing head. Next, although not shown, an insulating layer of alumina, for example, having a thickness of 4 to 5 $\mu$m, is formed over the entire surface. This insulating layer is polished through CMP, for example, so that the bottom shield layer 3 is exposed and the surface is flattened.

Next, as shown in FIG. 11A and FIG. 11B, on the bottom shield layer 3, alumina or aluminum nitride, for example, is deposited through sputtering to form the bottom shield gap film 4 as an insulating layer. On the bottom shield gap film 4, an MR film having a thickness of tens of nanometers is formed for making the MR element 5 for reproduction. Next, on the MR film a photoresist pattern is selectively formed where the MR element 5 is to be formed. Next, with the photoresist pattern as a mask, the MR film is etched through ion milling, for example, to form the MR element 5. Next, on the bottom shield gap film 4, a pair of electrode layers 6 having a thickness of tens of nanometers are formed, using the photoresist pattern as a mask. The electrode layers 6 are electrically connected to the MR element 5. Next, the top shield gap film 7 is formed as an insulating layer on the bottom shield gap film 4 and the MR element 5. The MR element 5 is embedded in the shield gap films 4 and 7. Next, on the top shield gap film 7, the first portion 8a of the bottom pole layer, having a thickness of about 1.0 to 2.0 $\mu$m, is selectively formed. The bottom pole layer is made of a magnetic material and used for both a reproducing head and a recording head.

Next, as shown in FIG. 12A and 12B, the second portion 8b and the third portion 8c of the bottom pole layer, each having a thickness of 1.5 to 2.5 µm, are formed on the first portion 8a. Next, an insulating layer 21 of alumina, for example, is formed over the entire surface. The insulating layer 21 has a thickness sufficient for covering the second portion 8b and the third portion 8c. The insulating layer 21 is polished through CMP, for example, until the second portion 8b and the third portion 8c are exposed, and the surface is thereby flattened.

Next, the recording gap layer 14 made of an insulating material whose thickness is about 0.2 to 0.3 µm is formed on second portion 8b and the third portion 8c of the bottom pole layer, and the insulating layer 21. A portion of the recording gap layer 14 on the third portion 8c is etched to form a contact hole for making a magnetic path.

Next, the second portion 15b of the top pole layer, having a thickness of 2.0 to 3.0 µm, is formed on the recording gap layer 14. The third portion 15c of the top pole layer, having a thickness of 2.0 to 3.0 µm, is formed on the third portion 8c of the bottom pole layer. In this embodiment, the second portion 15b of the top pole layer is greater than the second portion 8b of the bottom pole layer in length.

Next, an insulating layer 22 of alumina, for example, is formed over the entire surface. The thickness of the insulating layer 22 is preferably 1 µm or less. In the embodiment, the thickness of the insulating layer 22 is preferably about 0.3 to 0.6 µm.

Next, although not shown, a seed layer is formed through sputtering, for example, for making a first layer of thin-film coil. A photoresist is then applied to the top of the seed layer and patterned through a photolithography process. A frame 23 to be used for plating is thus formed.

In the embodiment, the frame 23 is formed such that: the first layer of the thin-film coil is placed between the second portion 15b and the third portion 15c of the top pole layer; and the outermost and innermost ends of the first layer of the coil are placed adjacent to the sidewall of the second portion 15b or the sidewall of the third portion 15c while the insulating film 22 formed on the sidewall of the second portion 15b is placed between the outermost end of the first layer 24 of the coil and the sidewall of the second portion 15b, and the insulating film 22 formed on the sidewall of the third portion 15c is placed between the innermost end of the first layer 24 and the sidewall of the third portion 15c.

Next, the first layer 24 of the coils made of copper (Cu), for example, is formed by frame plating through the use of the frame 23. The thickness of the first layer 24 is about 1.0 to 2.0 µm, for example. The pitch thereof is about 1.2 to 2.0 µm, for example.

In the embodiment as thus described, the first layer 24 of the thin-film coil is placed between the second portion 15b and the third portion 15c of the top pole layer. In addition, the outermost and innermost ends of the first layer 24 are placed adjacent to the sidewall of the second portion 15b or the sidewall of the third portion 15c while the insulating film 22 formed on the sidewall of the second portion 15b is placed between the outermost end of the first layer 24 of the coil and the sidewall of the second portion 15b, and the insulating film 22 formed on the sidewall of the third portion 15c is placed between the innermost end of the first layer 24 and the sidewall of the third portion 15c.

Figures 13A, 13B:
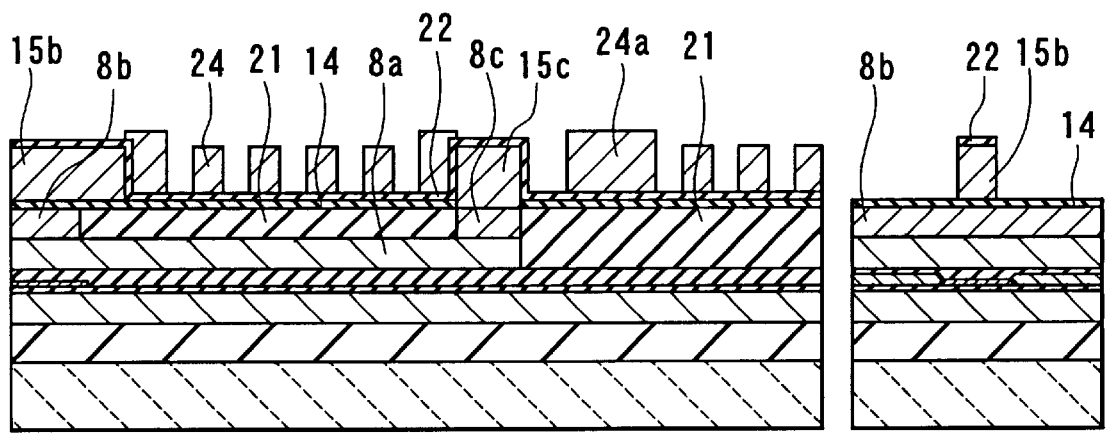
FIG. 13A and FIG. 13B are cross sections for illustrating a step that follows FIG. 12A and FIG. 12B.

Next, as shown in FIG. 13A and FIG. 13B, the frame 23 and the seed layer beneath it are removed.

Figures 14A, 14B:
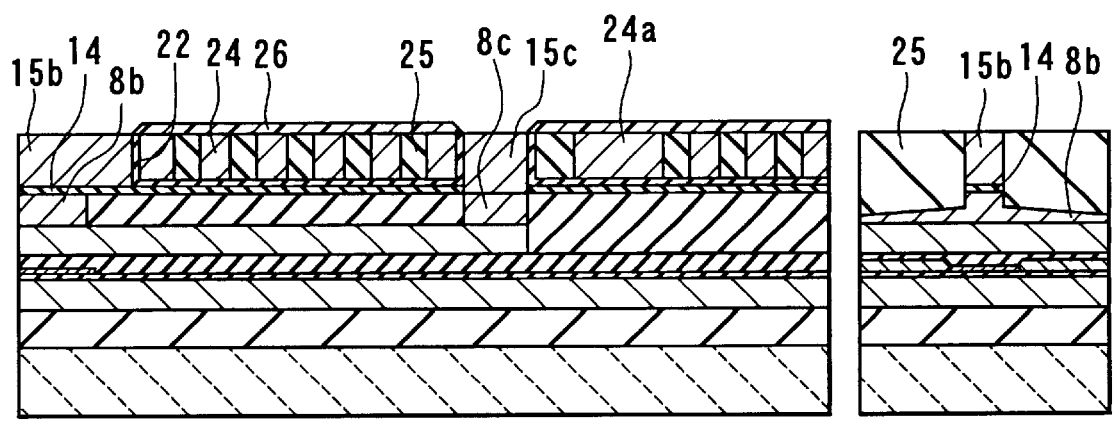
FIG. 14A and FIG. 14B are cross sections for illustrating a step that follows FIG. 13A and FIG. 13B.

Next, as shown in FIG. 14A and FIG. 14B, the recording gap layer 14 is selectively etched through dry etching, using the second portion 15b of the top pole layer as a mask. Next, the second portion 8b of the bottom pole layer is selectively etched by about 0.3 to 0.6 µm through argon ion milling, for example. A trim structure as shown in FIG. 14B is thus formed.

Next, an insulating layer 25 made of alumina, for example, and having a thickness of about 3 to 4 µm is formed over the entire surface. The insulating layer 25 is polished through CMP, for example, until the second portion 15b and the third portion 15c are exposed, and the surface is flattened. Although the entire first layer 24 of the coil is exposed in FIG. 14A, the entire first layer 24 may not be exposed. Alternatively, only a portion of the first layer 24 adjacent to the sidewall of the second portion 15b or the third portion 15c through the insulating film 22 may be exposed. If a portion 24a of the first layer 24 that is to be connected to a second layer of the coil described later is not exposed through the flattening process, the portion 24a is exposed through a photolithography technique.

Next, an insulating layer 26 of photoresist, for example, is formed on the flattened insulating layer 25. If the entire first layer 24 of the coil is not exposed, the insulating layer 26 is not necessary.

Figures 15A, 15B:
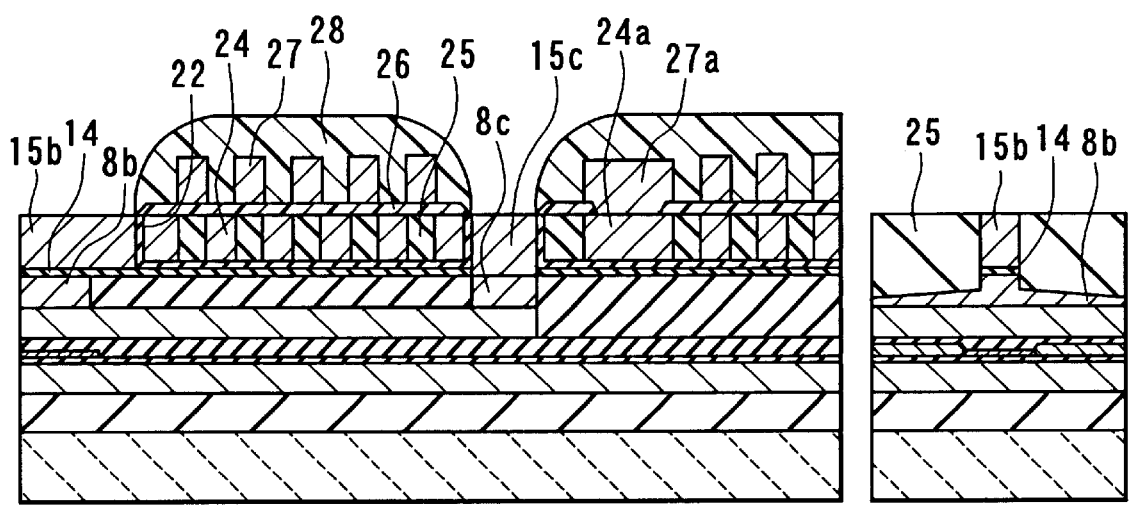
FIG. 15A and FIG. 15B are cross sections for illustrating a step that follows FIG. 14A and FIG. 14B.

Next, as shown in FIG. 15A and FIG. 15B, a portion of the insulating layer 26 on the portion 24a of the first layer 24 is etched to form a contact hole. Next, the second layer 27 of the coil made of copper (Cu), for example, is formed by frame plating. A portion 27a of the second layer 27 placed on the portion 24a of the first layer 24 is connected to the portion 24a through the contact hole.

Next, a photoresist layer 28 is formed into a specific pattern on the insulating layer 26 and the coil 27. Heat treatment is then performed at a specific temperature to flatten the surface of the photoresist layer 28.

Figures 16A, 16B:
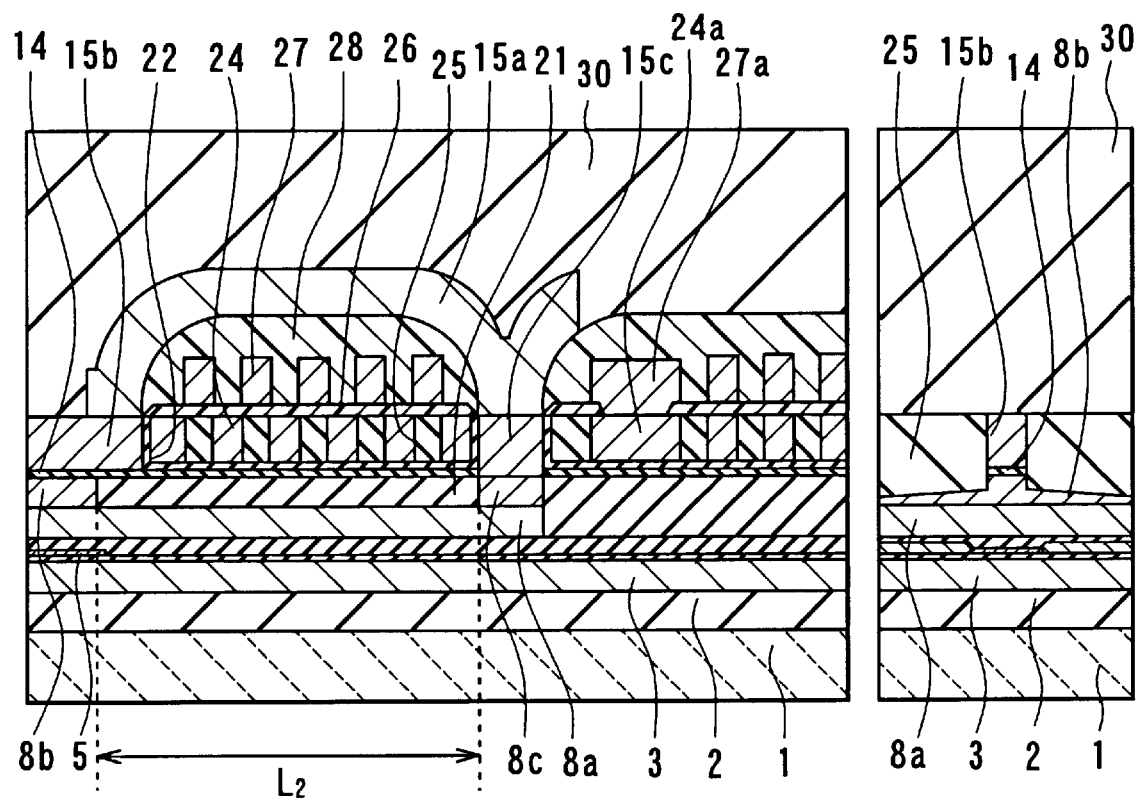
FIG. 16A and FIG. 16B are cross sections for illustrating a step that follows FIG. 15A and FIG. 15B.
Figure 20A:
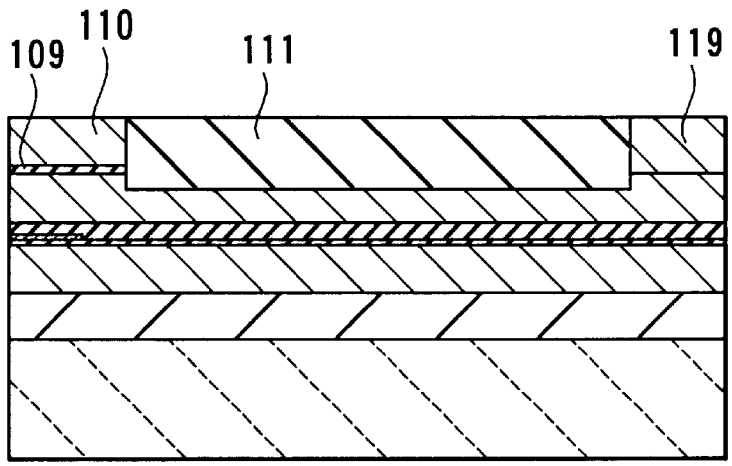
FIG. 20A and FIG. 20B are cross sections for illustrating a step that follows FIG. 19A and FIG. 19B.
Figure 20B:
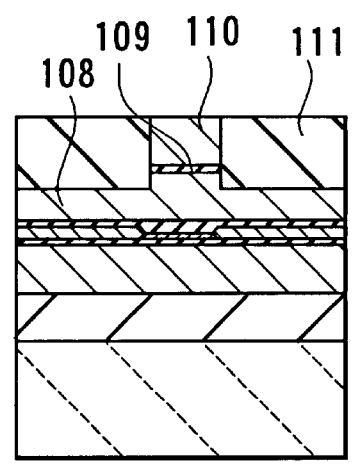
Figure 21A:
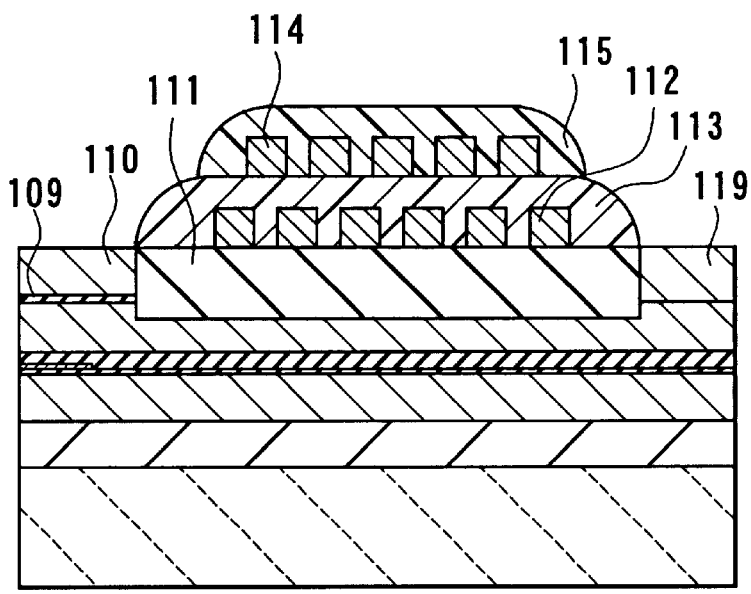
FIG. 21A and FIG. 21B are cross sections for illustrating a step that follows FIG. 20A and FIG. 20B.
Figure 21B:
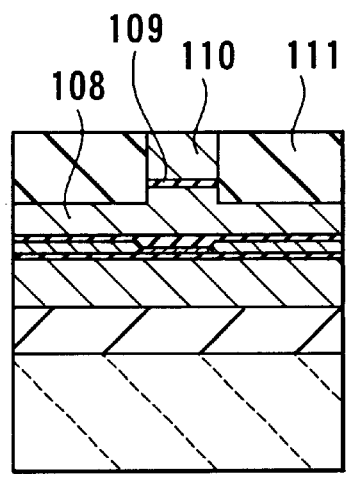

Next, as shown in FIG. 16A and FIG. 16B, the first portion 15a of the top pole layer made of a magnetic material and having a thickness of about 2 to 3 µm, for example, is formed for the recording head on the second portion 15b and the third portion 15c of the top pole layer and the photoresist layer 28. The first portion 15a is in contact with the third portion 8c of the bottom pole layer and magnetically coupled to the third portion 15c through the third portion 15c.

In the embodiment, the end face of the first portion 15a of the top pole layer that faces toward a recording medium (the air bearing surface) is placed at a distance from the surface of the thin-film magnetic head that faces toward the recording medium.

Next, an overcoat layer 30 of alumina, for example, having a thickness of 20 to 40 µm is formed to cover the first portion 15a. The surface of the overcoat layer 30 is then flattened and pads (not shown) for electrodes are formed on the overcoat layer 30. Finally, lapping of the slider is performed to form the air bearing surfaces of the recording head and the reproducing head. The thin-film magnetic head of the embodiment is thus completed.

It is assumed that the yoke length is $L_2$, as shown in FIG. 16A, if the coils 24 and 27 of the embodiment are fabricated, according to the design rule the same as that of the related-art magnetic head shown in FIG. 22A. A specific example of the value of yoke length $L_2$ may be 10.6 µm, which is about 50 percent of 19.0 µm, that is, yoke length $L_0$ of the related-art head.

In the second embodiment, the first portion 15a of the top pole layer is not formed on a flat surface. Therefore, the second embodiment does not produce some of the effects of the first embodiment that result from the configuration wherein the first portion 15a is formed on the flat surface.

According to the second embodiment, manufacturing costs are reduced since the number of steps including CMP is reduced.

The remainder of the configuration, operations and effects of the embodiment are similar to those of the first embodiment.

The present invention is not limited to the foregoing embodiments but may be practiced in still other ways. For example, in the foregoing embodiments, both outermost and innermost ends of a portion of the thin-film coil placed between the second and third portions of the bottom or top pole layer are placed adjacent to the sidewall of the second portion and the sidewall of the third portion while the insulating film formed on the sidewall of the second portion is placed between the outermost end of the portion of the coil and the sidewall of the second portion, and the insulating film formed on the sidewall of the third portion is placed between the innermost end of the portion of the coil and the sidewall of the third portion. Alternatively, either the outermost or innermost end of a portion of the coil may be placed adjacent to the sidewall of the second portion or the sidewall of the third portion while the insulating film formed on the sidewall of the second portion is placed between the outermost end of the portion of the coil and the sidewall of the second portion, or the insulating film formed on the sidewall of the third portion is placed between the innermost end of the portion of the coil and the sidewall of the third portion.

Although the bottom pole layer defines the throat height in the foregoing embodiments, the top pole layer may define the throat height.

In the foregoing embodiments the thin-film magnetic head is disclosed, comprising the MR element for reading formed on the base body and the induction-type magnetic transducer for writing stacked on the MR element. Alternatively, the MR element may be stacked on the magnetic transducer.

That is, the induction-type magnetic transducer for writing may be formed on the base body and the MR element for reading may be stacked on the transducer. Such a structure may be achieved by forming a magnetic film functioning as the top pole layer of the foregoing embodiments as a bottom pole layer on the base body, and forming a magnetic film functioning as the bottom pole layer of the embodiments as a top pole layer facing the bottom pole layer with a recording gap film in between. In this case it is preferred that the top pole layer of the induction-type magnetic transducer functions as the bottom shield layer of the MR element as well.

A base body having a concave is preferred for the thin-film magnetic head having such a structure. If the coils are formed in the concave of the base body, the thin-film magnetic head is further reduced in size.

The invention may be applied to a thin-film magnetic head having only an induction-type magnetic transducer for performing both reading and writing.

According to the thin-film magnetic head or the method of manufacturing the same of the invention described so far, at least one of the first and second magnetic layers includes: the first portion located in a region including a region that faces the coil; the second portion including one of the pole portions and connected to the first portion; and the third portion for connecting the first portion to the other magnetic layer. The at least part of the coil is placed between the second portion and the third portion of the at least one of the magnetic layers. The head further comprises at least one of: the insulating film formed on the sidewall of the second portion and placed between the outermost end of the at least part of the coil and the sidewall of the second portion; and the insulating film formed on the sidewall of the third portion and placed between the innermost end of the at least part of the coil and the sidewall of the third portion. The outermost end of the at least part of the coil is placed adjacent to the sidewall of the second portion while the insulating film is placed between the outermost end and the sidewall of the second portion, or the innermost end of the at least part of the coil is placed adjacent to the sidewall of the third portion while the insulating film is placed between the innermost end and the sidewall of the third portion, or each of the outermost and innermost ends of the at least part of the coil is adjacent to each of the sidewall of the second portion and the sidewall of the third portion, respectively, while each of the insulating films is placed between the outermost end and the sidewall of the second portion and between the innermost end and the sidewall of the third portion, respectively. As a result, according to the head or the method of the invention, the second portion of at least one of the first and second magnetic layers is formed into a reduced size. The track width of the recording head is thereby reduced. Furthermore, since at least part of the thin-film coil is formed on the flat surface, the pitch of the at least part of the coil is reduced, and the portion made up of the at least part of the coil and the insulating film surrounding it is reduced in size. The yoke length of the recording head is therefore reduced.

The throat height may be defined by the second portion of the first magnetic layer. The throat height is thereby precisely defined.

An end face of the first portion of the second magnetic layer that faces toward a recording medium may be located at a distance from the medium facing surface of the head. An increase in effective track width is thereby prevented.

Each of the first and second magnetic layers may include the first, second and third portions, and the thin-film coil may include: the first layer portion placed between the second portion and the third portion of the first magnetic layer; and the second layer portion placed between the second portion and the third portion of the second magnetic layer. As a result, each of the first and second layer portions of the coil is formed on the flat surface. The coil pitch is thereby reduced so that the yoke length is further reduced.

Obviously many modifications and variations of the present invention are possible in the light of the above teachings. It is therefore to be understood that within the scope of the appended claims the invention may be practiced otherwise than as specifically described.

What is claimed is:

1. A thin-film magnetic head comprising: a first magnetic layer and a second magnetic layer magnetically coupled to each other and including magnetic pole portions that are opposed to each other and placed in regions of the magnetic layers on a side of a medium facing surface of the head that faces toward a recording medium, each of the magnetic layers including at least one layer; a gap layer provided between the pole portions of the first and second magnetic layers; and a thin-film coil at least part of which is placed between the first and second magnetic layers, the at least part of the coil being insulated from the first and second magnetic layers; wherein:

each of the first and second magnetic layers includes: a first portion located in a region including a area that faces toward the coil; a second portion including one of the pole portions and connected to the first portion; and a third portion for connecting the first portion to the other magnetic layer;

the at least part of the coil is placed between the second portion and the third portion of the at least one of the magnetic layers;

the head further comprises at least one of: an insulating film formed on a sidewall of the second portion and disposed between an outermost end of the at least part of the coil and the sidewall of the second portion; and an insulating film formed on a sidewall of the third portion and disposed between an innermost end of the at least part of the coil and the sidewall of the third portion;

the outermost end of the at least part of the coil is separated from the sidewall of the second portion only by a single layer, the single layer being the insulating film disposed between the outermost end and the sidewall of the second portion, or the innermost end of the at least part of the coil is separated from the sidewall of the third portion only by a single layer, the single layer being the insulating film disposed between the innermost end and the sidewall of the third portion, or each of the outermost and innermost ends of the at least part of the coil is separated from each of the sidewall of the second portion and the sidewall of the third portion, respectively, only by single layers, the single layers being the insulating films disposed between the outermost end and the sidewall of the second portion and between the innermost end and the sidewall of the third portion, respectively;

the head further comprises an insulating layer covering the at least part of the coil; and the thin-film coil includes: a first layer portion placed between the second portion and the third portion of the first magnetic layer; and a second layer portion placed between the second portion and the third portion of the second magnetic layer.

2. The thin-film magnetic head according to claim 1, wherein the insulating film is 1 µm or less in thickness.

3. The thin-film magnetic head according to claim 1, wherein:

the second portion of the first magnetic layer defines a throat height.

4. The thin-film magnetic head according to claim 1, wherein:

an end face of the first portion of the second magnetic layer that faces toward the recording medium is located at a distance from the medium facing surface of the head.

5. The thin-film magnetic head according to claim 1, wherein the second portion of the second magnetic layer is equal to or greater than the second portion of the first magnetic layer in length.

6. The thin-film magnetic head according to claim 1, further comprising: a magnetoresistive element; and a first shield layer and a second shield layer for shielding the magnetoresistive element, portions of the shield layers that face toward the recording medium being opposed to each other with the magnetoresistive element in between.

7. The thin-film magnetic head according to claim 6, wherein the second shield layer functions as the first magnetic layer as well.

8. A thin-film magnetic head comprising: a first magnetic layer and a second magnetic layer magnetically coupled to each other and including magnetic pole portions that are opposed to each other and placed in regions of the magnetic layers on a side of a medium facing surface of the head that faces toward a recording medium, each of the magnetic layers including at least one layer; a gap layer provided between the pole portions of the first and second magnetic layers; and a thin-film coil at least part of which is placed between the first and second magnetic layers, the at least part of the coil being insulated from the first and second magnetic layers; wherein:

at least one of the first and second magnetic layers includes: a first portion located in a region including a area that faces toward the coil; a second portion including one of the pole portions and connected to the first portion; and a third portion for connecting the first portion to the other magnetic layer;

the at least part of the coil is placed between the second portion and the third portion of the at least one of the magnetic layers;

the head further comprises at least one of: an insulating film formed on a sidewall of the second portion and disposed between an outermost end of the at least part of the coil and the sidewall of the second portion; and an insulating film formed on a sidewall of the third portion and disposed between an innermost end of the at least part of the coil and the sidewall of the third portion;

the outermost end of the at least part of the coil is separated from the sidewall of the second portion only by the insulating film disposed between the outermost end and the sidewall of the second portion, or the innermost end of the at least part of the coil is separated from the sidewall of the third portion only by the insulating film disposed between the innermost end and the sidewall of the third portion, or each of the outermost and innermost ends of the at least part of the coil is separated from each of the sidewall of the second portion and the sidewall of the third portion, respectively, only by each of the insulating films disposed between the outermost end and the sidewall of the second portion and between the innermost end and the sidewall of the third portion, respectively; and the head further comprises an insulating layer covering the at least part of the coil and not extending beyond at least one of the outermost end and the innermost end of the at least one part of the coil.

9. The thin-film magnetic head according to claim 8, wherein the insulating film is 1 µm or less in thickness.

10. The thin-film magnetic head according to claim 8, wherein:

the first magnetic layer includes the first, second and third portions; and the second portion of the first magnetic layer defines a throat height.

11. The thin-film magnetic head according to claim 8, wherein:

the second magnetic layer includes the first, second and third portions; and an end face of the first portion of the second magnetic layer that-faces toward the recording medium is located at a distance from the medium facing surface of the head.

12. The thin-film magnetic head according to claim 8, wherein each of the first and second magnetic layers includes the first, second and third portions.

13. The thin-film magnetic head according to claim 12, wherein the second portion of the second magnetic layer is equal to or greater than the second portion of the first magnetic layer in length.

14. The thin-film magnetic head according to claim 12, wherein the thin-film coil includes: a first layer portion placed between the second portion and the third portion of the first magnetic layer; and a second layer portion placed between the second portion and the third portion of the second magnetic layer.

15. The thin-film magnetic head according to claim 8, wherein:
   the second magnetic layer includes the first, second and third portions; and
   the thin-film coil includes: a first layer portion placed between the second portion and the third portion of the second magnetic layer; and a second layer portion placed on a side of the first layer portion opposite to the first magnetic layer.

16. The thin-film magnetic head according to claim 8, further comprising: a magnetoresistive element; and a first shield layer and a second shield layer for shielding the magnetoresistive element, portions of the shield layers that face toward the recording medium being opposed to each other with the magnetoresistive element in between.

17. The thin-film magnetic head according to claim 16, wherein the second shield layer functions as the first magnetic layer as well.

18. A thin-film magnetic head comprising: a first magnetic layer and a second magnetic layer magnetically coupled to each other and including magnetic pole portions that are opposed to each other and placed in regions of the magnetic layers on a side of a medium facing surface of the head that faces toward a recording medium, each of the magnetic layers including at least one layer; a gap layer provided between the pole portions of the first and second magnetic layers; and a thin-film coil at least part of which is placed between the first and second magnetic layers, the at least part of the coil being insulated from the first and second magnetic layers; wherein:

at least one of the first and second magnetic layers includes: a first portion located in a region including a area that faces toward the coil; a second portion including one of the pole portions and connected to the first portion; and a third portion for connecting the first portion to the other magnetic layer;

the at least part of the coil is placed between the second portion and the third portion of the at least one of the magnetic layers;

the head further comprises: (i) a first insulating film portion formed underneath the coil, and (ii) at least one of a second insulating film portion formed on a sidewall of the second portion and disposed between an outermost end of the at least part of the coil and the sidewall of the second portion; and a second insulating film portion formed on a sidewall of the third portion and disposed between an innermost end of the at least part of the coil and the sidewall of the third portion, each second insulating film portion having a thickness not greater than approximately a thickness of the first insulating film portion; and the outermost end of the at least part of the coil is separated from the sidewall of the second portion only by the second insulating film portion disposed between the outermost end and the sidewall of the second portion, or the innermost end of the at least part of the coil is separated from the sidewall of the third portion only by the second insulating film portion disposed between the innermost end and the sidewall of the third portion, or each of the outermost and innermost ends of the at least part of the coil is separated from each of the sidewall of the second portion and the sidewall of the third portion, respectively, only by each of the second insulating film portions disposed between the outermost end and the sidewall of the second portion and between the innermost end and the sidewall of the third portion, respectively.

* * * * *